US008873092B2

(12) United States Patent
Ohhashi

(10) Patent No.: US 8,873,092 B2
(45) Date of Patent: Oct. 28, 2014

(54) PRINTING SYSTEM, PRINTING DEVICE, HOST DEVICE, AND COMPUTER ACCESSIBLE STORAGE STORING PROGRAM THEREFOR

(75) Inventor: Masashi Ohhashi, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 100 days.

(21) Appl. No.: 13/338,741

(22) Filed: Dec. 28, 2011

(65) Prior Publication Data
US 2012/0162714 A1 Jun. 28, 2012

(30) Foreign Application Priority Data

Dec. 28, 2010 (JP) ................................. 2010-293939

(51) Int. Cl.
*G06F 3/12* (2006.01)
(52) U.S. Cl.
CPC .............. *G06F 3/122* (2013.01); *G06F 3/1238* (2013.01); *G06F 3/1288* (2013.01); *G06F 3/1274* (2013.01); *G06F 3/1267* (2013.01); *G06F 3/1213* (2013.01); *G06F 3/1222* (2013.01)
USPC ......................... 358/1.15; 358/1.14; 358/1.16
(58) Field of Classification Search
None
See application file for complete search history.

(56) References Cited

U.S. PATENT DOCUMENTS

| 6,219,152 | B1 | 4/2001 | Someya et al. | |
|---|---|---|---|---|
| 6,307,640 | B1 * | 10/2001 | Motegi | 358/1.14 |
| 6,313,921 | B1 * | 11/2001 | Kadowaki | 358/1.15 |
| 7,019,854 | B1 * | 3/2006 | Sawano | 358/1.15 |
| 7,088,461 | B2 * | 8/2006 | Miyano | 358/1.14 |
| 7,443,527 | B1 * | 10/2008 | Shigeeda | 358/1.15 |
| 7,557,950 | B2 * | 7/2009 | Hatta et al. | 358/1.9 |
| 7,830,540 | B2 | 11/2010 | Matsuda | |
| 7,982,900 | B2 * | 7/2011 | Miura et al. | 358/1.16 |
| 8,004,710 | B2 * | 8/2011 | Kanbara | 358/1.16 |

(Continued)

FOREIGN PATENT DOCUMENTS

| JP | HEI 9-251357 A | 9/1997 |
|---|---|---|
| JP | 2000-267825 | 9/2000 |

(Continued)

OTHER PUBLICATIONS

Notification of Reasons for Rejection dated Feb. 12, 2013 received from the Japanese Patent Office from related Japanese Application No. 2010-293939, together with an English-language translation.

(Continued)

*Primary Examiner* — Ashish K Thomas
(74) *Attorney, Agent, or Firm* — Scully, Scott, Murphy & Presser, PC

(57) ABSTRACT

A printing system is configured such that, when authentication data is input by a user and a print request is made, if print data regarding the print request is stored in a printing device side storage, the printing device prints images on a printing sheet based on the print data stored in the printing device side storage, while, if the print data has been deleted by the printing device side deletion unit and is not stored in the printing device side storage, the printing device transmits print data request data identifying the print data regarding the print request to a host device and obtains the print data regarding the print request, and prints images on the printing sheet based on the obtained print data.

19 Claims, 13 Drawing Sheets

(56) References Cited

U.S. PATENT DOCUMENTS

| | | | |
|---|---|---|---|
| 8,154,742 B2* | 4/2012 | Kawakami et al. | 358/1.15 |
| 8,223,376 B2* | 7/2012 | Shudo | 358/1.15 |
| 8,228,537 B2* | 7/2012 | Uehara | 358/1.15 |
| 8,233,179 B2* | 7/2012 | Nakamura et al. | 358/1.15 |
| 8,330,975 B2* | 12/2012 | Matsuda | 358/1.15 |
| 8,390,838 B2* | 3/2013 | Sawada et al. | 358/1.14 |
| 8,446,619 B2* | 5/2013 | Wada | 358/1.15 |
| 8,456,670 B2* | 6/2013 | Kusakabe | 358/1.15 |
| 2006/0172730 A1 | 8/2006 | Matsuda | |
| 2007/0058193 A1* | 3/2007 | Wu | 358/1.15 |
| 2009/0257078 A1* | 10/2009 | Sawada et al. | 358/1.14 |
| 2009/0279118 A1* | 11/2009 | Ito | 358/1.14 |
| 2010/0214589 A1 | 8/2010 | Fukano et al. | |

FOREIGN PATENT DOCUMENTS

| | | |
|---|---|---|
| JP | 2005-190405 A | 7/2005 |
| JP | 2006-211560 | 8/2006 |
| JP | 2006-343840 | 12/2006 |
| JP | 2007-34493 | 2/2007 |
| JP | 2008-203999 A | 9/2008 |
| JP | 2009-78503 | 4/2009 |
| JP | 2009-187291 | 8/2009 |
| JP | 2009-237842 | 10/2009 |

OTHER PUBLICATIONS

Notification of Reasons for Rejection dated Oct. 29, 2013 from related Japanese Application No. 2010-293939, together with an English language translation.

* cited by examiner

26

| PRINT DATA ID | PRINTING DEVICE IN WHICH PRINT DATA IS CURRENTLY STORED |
|---|---|
| PRINT DATA A | PRINTING DEVICE A, PRINTING DEVICE B |
| PRINT DATA B | PRINTING DEVICE A, PRINTING DEVICE B, PRINTING DEVICE D |

| DEVICES BEING USED | DEVICE NOT BEING USED |
|---|---|
| PRINTING DEVICE A<br>PRINTING DEVICE D<br>PRINTING DEVICE F<br>PRINTING DEVICE G | PRINTING DEVICE B<br>PRINTING DEVICE C<br>PRINTING DEVICE E |

| PRINT DATA (APPLICATION DATA) | HEADER INFORMATION | | | | AUTHENTICATION DATA |
|---|---|---|---|---|---|
| | PRINT DATA ID | USER ID | SENDING TERMINAL DEVICE ID | (DESTINATION PRINTING DEVICE ID) | |

FIG. 4B

| USER ID | SENDIG TERMINAL DEVICE ID (SENDING PRINTING DEVICE ID) |
|---|---|

FIG. 4C

| PRINT MANAGEMENT INFORMATION | USAGE MANAGEMENT TABLE |
|---|---|

FIG. 4D

| PRINT DATA ID | RE-SEND DESTINATION PRINTING DEVICE ID |
|---|---|

FIG. 4E

| PRINT DATA (PDL DATA) | PRINT DATA ID | USER ID | AUTHENTICATION DATA |
|---|---|---|---|

FIG. 4F

| PRINT DATA ID | SENDING PRINTING DEVICE ID |
|---|---|

FIG. 4G

| PRINT DATA ID | SENDING PRINTING DEVICE ID |
|---|---|

FIG. 5A

| PRINT DATA ID |
|---|

FIG. 5B

| PRINT DATA ID | SENDING PRINTING DEVICE ID |
|---|---|

FIG. 5C

| SENDING PRINTING DEVICE ID |
|---|

FIG. 5D

| SENDING PRINTING DEVICE ID |
|---|

| PRINT MANAGEMENT INFORMATION | PRINT DATA ID | HEADER INFORMATION OF PRINT REQUEST DATA | | | PRINTING DEVICE IN WHICH PRINT DATA IS CURRENTLY STORED (STORING PRINTING DEVICE ID) |
|---|---|---|---|---|---|
| | | USER ID | SENDING TERMINAL ID | DESTINATION PRINTING DEVICE ID | |
| PRINT MANAGEMENT INFORMATION A | PRINT DATA A | USER A | TERMINAL DEVICE A | PRINTING DEVICE A, PRINTING DEVICE B, PRINTING DEVICE C | ... | PRINTING DEVICE A, PRINTING DEVICE B |
| PRINT MANAGEMENT INFORMATION B | PRINT DATA B | USER A | TERMINAL DEVICE A | PRINTING DEVICE A, PRINTING DEVICE B, PRINTING DEVICE D | ... | PRINTING DEVICE A, PRINTING DEVICE B, PRINTING DEVICE D |
| PRINT MANAGEMENT INFORMATION C | PRINT DATA C | USER B | TERMINAL DEVICE B | PRINTING DEVICE C, PRINTING DEVICE D, PRINTING DEVICE F | ... | PRINTING DEVICE C, PRINTING DEVICE D, PRINTING DEVICE F |
| PRINT MANAGEMENT INFORMATION D | PRINT DATA D | USER C | TERMINAL DEVICE C | --- | ... | PRINTING DEVICE F |
| ... | ... | ... | ... | ... | ... | ... |

FIG. 7

| PRINTING DEVICES BEING USED (USED PRINTING DEVICE ID) | PRINTING DEVICES NOT BEING USED (AVAIALBLE PRINTING DEVICE ID) |
|---|---|
| PRINTING DEVICE A<br>PRINTING DEVICE D<br>PRINTING DEVICE F<br>PRINTING DEVICE G | PRINTING DEVICE B<br>PRINTING DEVICE C<br>PRINTING DEVICE E |

FIG. 8

PRINTING SYSTEM, PRINTING DEVICE, HOST DEVICE, AND COMPUTER ACCESSIBLE STORAGE STORING PROGRAM THEREFOR

CROSS-REFERENCE TO RELATED APPLICATION

This application claims priority under 35 U.S.C. §119 from Japanese Patent Application No. 2010-293939 filed on Dec. 28, 2010. The entire subject matter of the application is incorporated herein by reference.

BACKGROUND

1. Technical Field

Aspects of the invention relate to a printing device configured to print images on printing sheets, a printing system employing such a printing device, a host device for the printing system, and a computer accessible storage that stores a program for such devices.

2. Related Art

There has been known a printing system including a plurality of terminal devices (e.g., personal computers), which are interconnected through a network and share one or more printing devices. In such a system, a printed matter of a certain user may be viewed by other users as the printing device is used by a plurality of users, and leakage of information may occur. Recently, various kinds of techniques are suggested to reduce possibility of information leakage in such a system.

In one of conventional techniques, one using authentication data is known. Typically, authentication data such as finger print data is registered with the terminal device. When printing is performed at the printing device, the printing device requests user to input authentication data. When the user input the authentication data in response to the request, the printing device transmits the input authentication data to the terminal device. The terminal device compares the authentication data transmitted from the printing device with preliminarily registered authentication data, and transmits print data stored in the terminal device to the printing device only if the transmitted authentication data matches the registered authentication data. With this configuration, possibility of information leakage is suppressed.

SUMMARY

According to the conventional system as described above, the user is required to input the authentication data before printing, the input authentication data is transmitted to the terminal device, and thereafter, the print data is transmitted from the terminal device to the printing device. Therefore, it takes relatively a long period from user's input of the authentication data to output of printed image, and the user needs to await in front of the printing device for a relatively long period.

It may be possible to transmit the print data from the terminal device to the printing device before the user's input of the authentication data. In such a configuration, the user can obtain the printed image immediately after the authentication. However, in such a configuration, the print data received by the printing device must be well managed. For example, if the capacity of a data storing area of the printing device is insufficient, the received print data should be transferred to another storage device, and management of the print data is complicated.

In consideration of the above problems, aspects of the invention provide an improved printing system in which a user's waiting time period from the user input of authentication data at the printing device to output of the printed image can be shortened, and the print data can be managed simply. Aspects of the invention also provide a host device, a printing device and computer accessible storage storing programs for such an printing system.

According to aspects of the invention, there is provided a printing system, which has a plurality of terminal devices configured to generate print data representing an image to be printed on a printing sheet, a printing device configured to print the image on the printing sheet, the printing device having a first storage, a host device communicably connected to the plurality of terminal devices and the printing device, the host device having a second storage configured to store the print data, a user authentication unit configured to acquire user input of authentication data, and execute user authentication based on the user-input authentication data when printing of the print data is requested, printing of the image being executed after the authentication is successfully completed, and a judging unit configured to judge whether the print data stored in the first storage is to be deleted before the print request which requests to execute printing of an image represented by the print data is received, Each of the plurality of terminal devices has a terminal side transmission unit configured to transmit the print data to the host device.

The host device has a host side communication unit which is configured to receive the print data from the plurality of terminal devices and store the received print data in the second storage, and to transmit the received print data to the printing device before the user authentication is executed.

If print data request data requesting the host device to transmit print data regarding the print request is received from the printing device, the print data identified by the print data request data and stored in the second storage is transmitted to the printing device, Further, the printing device is provided with a printing side receiving unit configured to received the print data from the host device and store the received print data in the first storage, and a first deletion unit configured to delete the print data which is judged to be deleted by the judging unit from the first storage.

When the authentication data is input by the user and the print request is made, if the print data regarding the print request is stored in the first storage, the printing device prints images on the printing sheet based on the print data stored in the first storage, while, if the print data has been deleted by the first deletion unit and is not stored in the first storage, the printing device transmits print data request data identifying the print data regarding the print request to the host device and obtains the print data regarding the print request, and prints images on the printing sheet based on the obtained print data.

According to aspects of the invention, there is provided a host device employed in a printing system which has a plurality of terminal devices configured to generate print data representing an image to be printed on a printing sheet, a printing device configured to print the image on the printing sheet, the printing device having a first storage, and the host device communicably connected to the plurality of terminal devices and the printing device, the host device having a second storage configured to store the print data, a judging unit configured to judge whether the print data stored in the first storage is to be deleted before the print request which requests to execute printing of an image represented by the print data is received, and a first deletion unit configured to delete the print data which is judged to be deleted by the judging unit from the first storage, wherein the printing device is configured to acquire user input of authentication data, and execute user authentication based on the user-input authentication data when printing of the print data is requested, printing of the image being executed after the authentication is successfully completed The host device is provided with a host side communication unit configured to receive the print data from the plurality of terminal devices and store the received print data in the second storage and transmit the received print data to the printing device before the user authentication is executed. When the authentication data is input by the user and the print request is made, if the print data has been deleted by the first deletion unit and is not stored in the first storage, the printing device transmits print data request data identifying the print data regarding the print request to the host device. Further, if the print data request data is received, the host side communication unit transmits the print data identified by the print data request data and stored in the second storage to the printing device.

According to aspects of the invention, there is provided a printing device employed in a printing system which is provided with a plurality of terminal devices configured to generate print data representing an image to be printed on a printing sheet, the printing device configured to print the image on the printing sheet, the printing device having a first storage, and a host device communicably connected to the plurality of terminal devices and the printing device, the host device having a second storage configured to store the print data, a judging unit configured to judge whether the print data stored in the first storage is to be deleted before the print request which requests to execute printing of an image represented by the print data is received, and a first deletion unit configured to delete the print data which is judged to be deleted by the judging unit from the first storage, wherein the printing device is configured to acquire user input of authentication data, and execute user authentication based on the user-input authentication data when printing of the print data is requested, printing of the image being executed after the authentication is successfully completed.

The printing device is provided with a printing side receiving unit configured to received the print data from the host device and store the received print data in the first storage, and a first deletion unit configured to delete the print data which is judged to be deleted by the judging unit from the first storage, When the authentication data is input by the user and the print request is made, if the print data regarding the print request is stored in the first storage, the printing device prints images on the printing sheet based on the print data stored in the first storage, while, if the print data has been deleted by the first deletion unit and is not stored in the first storage, the printing device transmits print data request data identifying the print data regarding the print request to the host device and obtains the print data regarding the print request, and prints images on the printing sheet based on the obtained print data.

According to aspects of the invention, there is provided a computer accessible storage storing control programs for a printing system which is provided with a plurality of terminal devices configured to generate print data representing an image to be printed on a printing sheet, a printing device configured to print an image on the printing sheet, the printing device having a first storage, a host device communicably connected to the plurality of terminal devices and the printing device, the host device having a second storage configured to store the print data, and a user authentication unit configured to acquire user input of authentication data, and execute user authentication based on the user-input authentication data when printing of the print data is requested, printing of the image being executed after the authentication is successfully completed.

The programs, when executed, cause one of the plurality of terminal devices, the printing device and the host device to judge whether the print data stored in the first storage is to be deleted before the print request which requests to execute printing of an image represented by the print data is received. The programs cause each of the plurality of terminal devices to execute a terminal side transmission process to transmit the print data to the host device, and the host device to execute a host side communication process. The communication process which is configured to receive the print data from the plurality of terminal devices and store the received print data in the second storage, to transmit the received print data to the printing device before the user authentication is executed, and, if print data request data requesting the host device to transmit print data regarding the print request is received from the printing device, to transmit the print data identified by the print data request data and stored in the second storage to the printing device, Further, the programs cause the printing device to execute a printing side receiving process to received the print data from the host device and store the received print data in the first storage, a first deletion process to delete the print data which is judged to be deleted by the judging unit from the first storage, and a printing process which is configured such that, when the authentication data is input by the user and the print request is made, if the print data regarding the print request is stored in the first storage, the printing device prints images on the printing sheet based on the print data stored in the first storage, while, if the print data has been deleted by the first deletion unit and is not stored in the first storage, the printing device transmits print data request data identifying the print data regarding the print request to the host device and obtains the print data regarding the print request, and prints images on the printing sheet based on the obtained print data.

According to aspects of the invention, there is provided a computer accessible storage storing control programs for a host device employed in a printing system which is provided with a plurality of terminal devices configured to generate print data representing an image to be printed on a printing sheet, a printing device configured to print the image on the printing sheet, the printing device having a first storage, and the host device communicably connected to the plurality of terminal devices and the printing device, the host device having a second storage configured to store the print data, a judging unit configured to judge whether the print data stored in the first storage is to be deleted before the print request which requests to execute printing of an image represented by the print data is received, and a first deletion unit configured to delete the print data which is judged to be deleted by the judging unit from the first storage, wherein the printing device is configured to acquire user input of authentication data, and execute user authentication based on the user-input authentication data when printing of the print data is requested, printing of the image being executed after the authentication is successfully completed, programs, when executed, cause the computer to execute a host side communication process to receive the print data from the plurality of terminal devices and store the received print data in the second storage and transmit the received print data to the printing device before the user authentication is executed, a requested print data transmission process to transmit the print data identified by the print data request data which is transmitted from the printing device, when the authentication data is input by the user and the print request is made, and if the print data has been deleted by the first deletion unit and is not stored in the first storage.

A computer accessible storage storing control programs for a printing device employed in a printing system which is provided with a plurality of terminal devices configured to generate print data representing an image to be printed on a printing sheet, the printing device configured to print the image on the printing sheet, the printing device having a first storage, and a host device communicably connected to the plurality of terminal devices and the printing device, the host device having a second storage configured to store the print data, a judging unit configured to judge whether the print data stored in the first storage is to be deleted before the print request which requests to execute printing of the image represented by the print data is received, and a first deletion unit configured to delete the print data which is judged to be deleted by the judging unit from the first storage, wherein the printing device is configured to acquire user input of authentication data, and execute user authentication based on the user-input authentication data when printing of the print data is requested, printing of the image being executed after the authentication is successfully completed. The programs cause, when executed, the printing device to execute a printing device side receiving process to received the print data from the host device and store the received print data in the first storage, a first deletion process to delete the print data which is judged to be deleted by the judging unit from the first storage, and a printing process.

When the authentication data is input by the user and the print request is made, if the print data regarding the print request is stored in the first storage, the printing device prints images on the printing sheet based on the print data stored in the first storage, while, if the print data has been deleted by the first deletion unit and is not stored in the first storage, the printing device transmits print data request data identifying the print data regarding the print request to the host device and obtains the print data regarding the print request, and prints images on the printing sheet based on the obtained print data.

According to further aspects of the invention, there is provided a printing system, which has a plurality of terminal devices configured to generate print data representing an image to be printed on a printing sheet, a printing device communicably connected to the terminal devices and configured to print the image on the printing sheet, the printing device having a first storage capable of storing the print data. The printing device is configured to acquire user input of authentication data, a user authentication being executed based on the user-input authentication data when printing of the print data is requested, printing of the image being executed after the authentication is successfully completed, and a judging unit configured to judge whether the print data stored in the first storage is to be deleted before the print request which requests to execute printing of the image represented by the print data is received.

Each of the plurality of terminal devices is provided with a terminal side transmission unit configured to transmit the print data to the host device. The host device has a host side communication unit which is configured to receive the print data from the plurality of terminal devices and store the received print data in the second storage, transmit the received print data to the printing device before the user authentication is executed, and if print data request data requesting the host device to transmit print data regarding the print request is received from the printing device, transmit the print data identified by the print data request data and stored in the second storage to the printing device.

The printing device includes a printing device side receiving unit configured to received the print data from the host device and store the received print data in the first storage, and a first deletion unit configured to delete the print data which is judged to be deleted by the judging unit from the first storage, When the authentication data is input by the user and the print request is made, if the print data regarding the print request is stored in the first storage, the printing device prints images on the printing sheet based on the print data stored in the first storage, while, if the print data has been deleted by the first deletion unit and is not stored in the first storage, the printing device transmits print data request data identifying the print data regarding the print request to the host device and obtains the print data regarding the print request, and prints images on the printing sheet based on the obtained print data.

BRIEF DESCRIPTION OF THE ACCOMPANYING DRAWINGS

FIG. 1 schematically shows a configuration of a printing system according to aspects of the invention.

FIG. 3 shows an example of a screen indicating storing status data which is displayed on a display unit of the terminal device.

FIGS. 4A-4G show data structure of data transmitted among the terminal device, a host device and a printing device, where FIG. 4A shows a data structure of print information transmission data, FIG. 4B shows a data structure of storing status transmission request data, FIG. 4C shows a data structure of storing status data, FIG. 4D shows a data structure of print data resend destination data, FIG. 4E shows a data structure of print authentication data, FIG. 4F shows a data structure of print data transmission request data and FIG. 4G shows a data structure of print completion data.

FIGS. 5A-5D show data structure of data transmitted among the terminal device, host device and the printing device, where FIG. 5A shows a data structure of deletion command data, FIG. 5B shows a data structure of deletion notifying data, FIG. 5C shows a data structure of usage notifying data and FIG. 5D shows a data structure of usage release notifying data.

Figure 1:
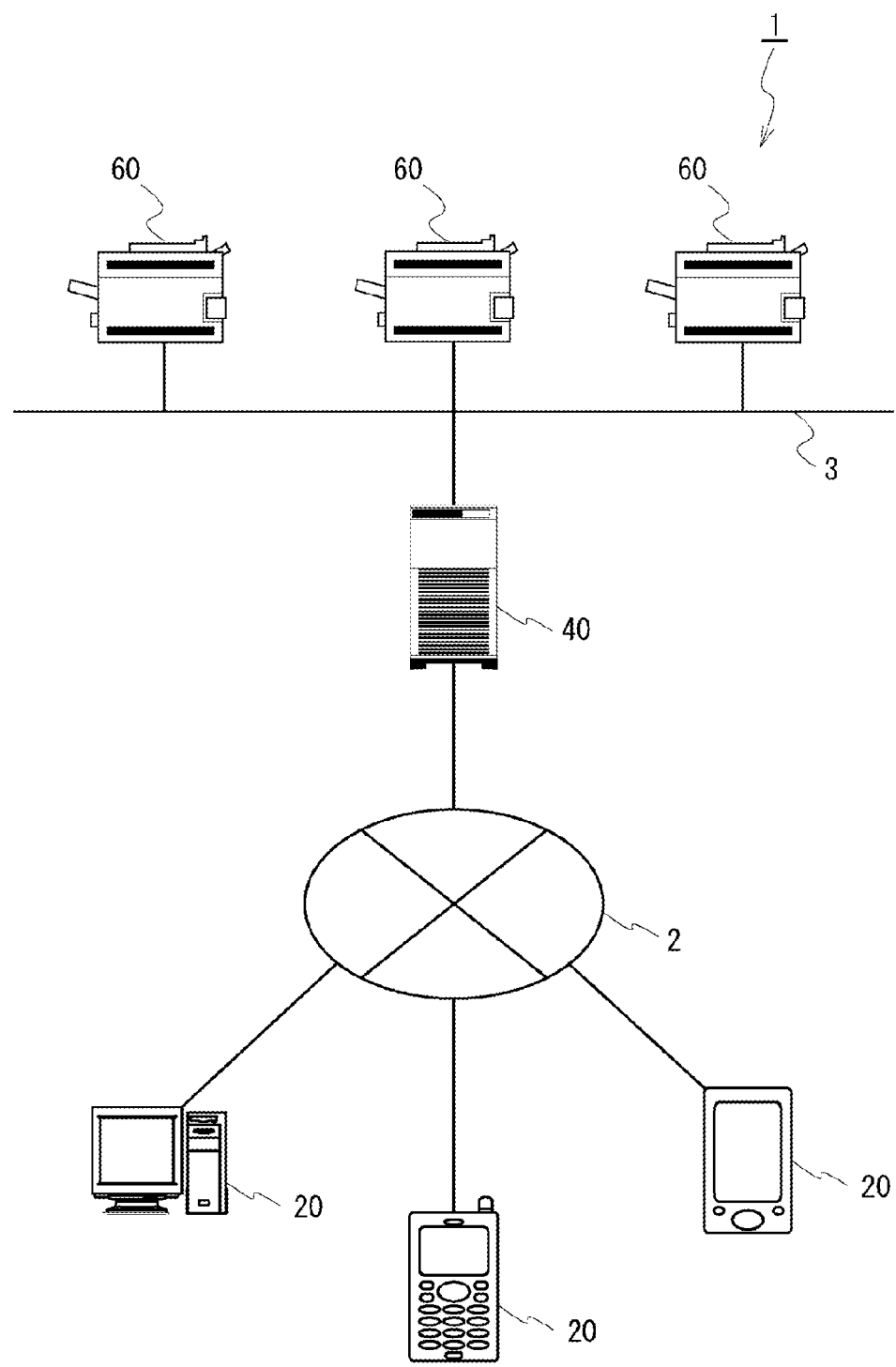
Figure 6:
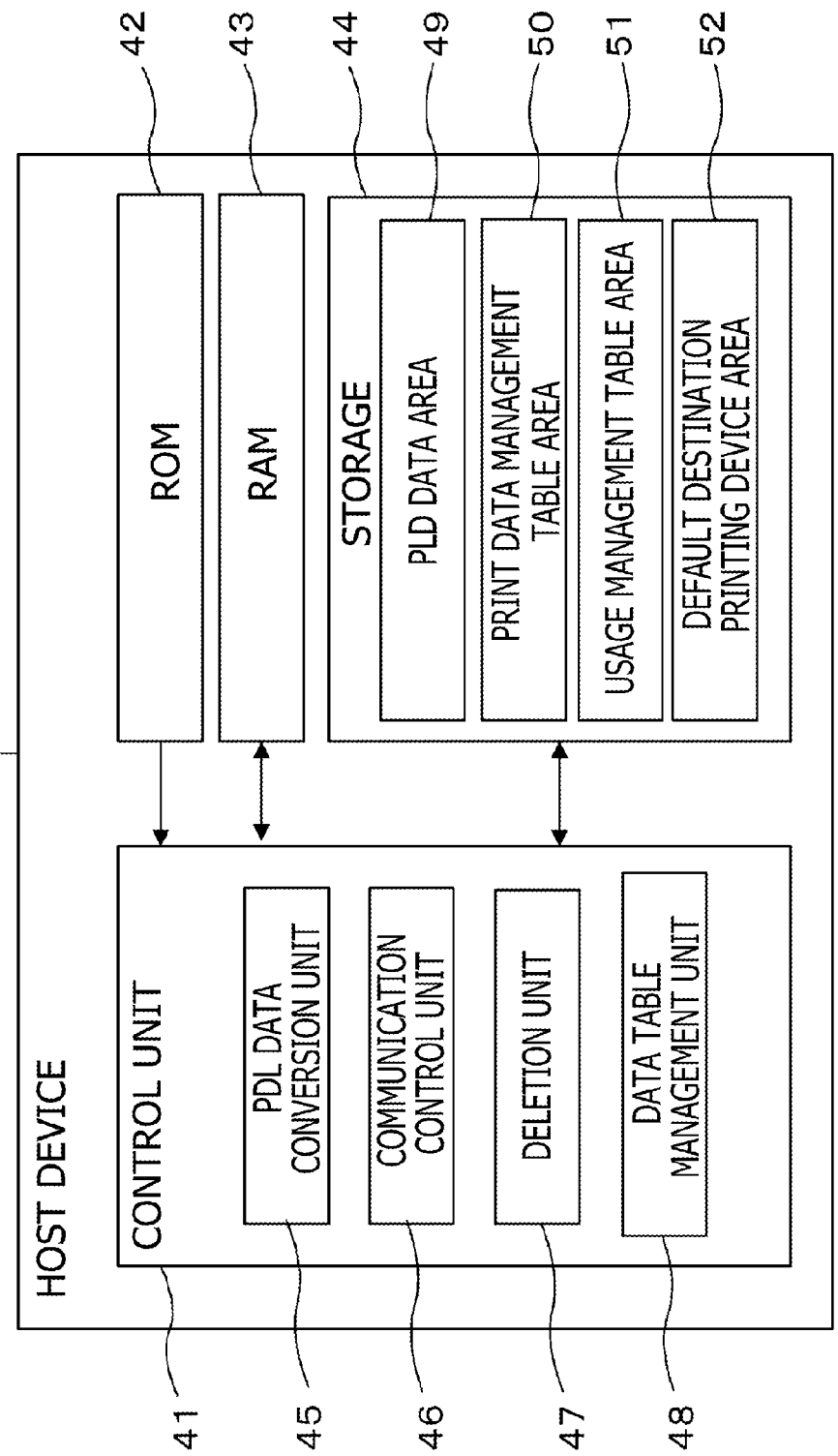

FIG. 6 is a block diagram showing a functional configuration of the host device shown in FIG. 1.

FIG. 7 shows an example of a print data management table stored in a storage of the host device shown in FIG. 6.

FIG. 8 shows an example of a usage status management table stored in the storage of the host device shown in FIG. 6.

Figure 9:
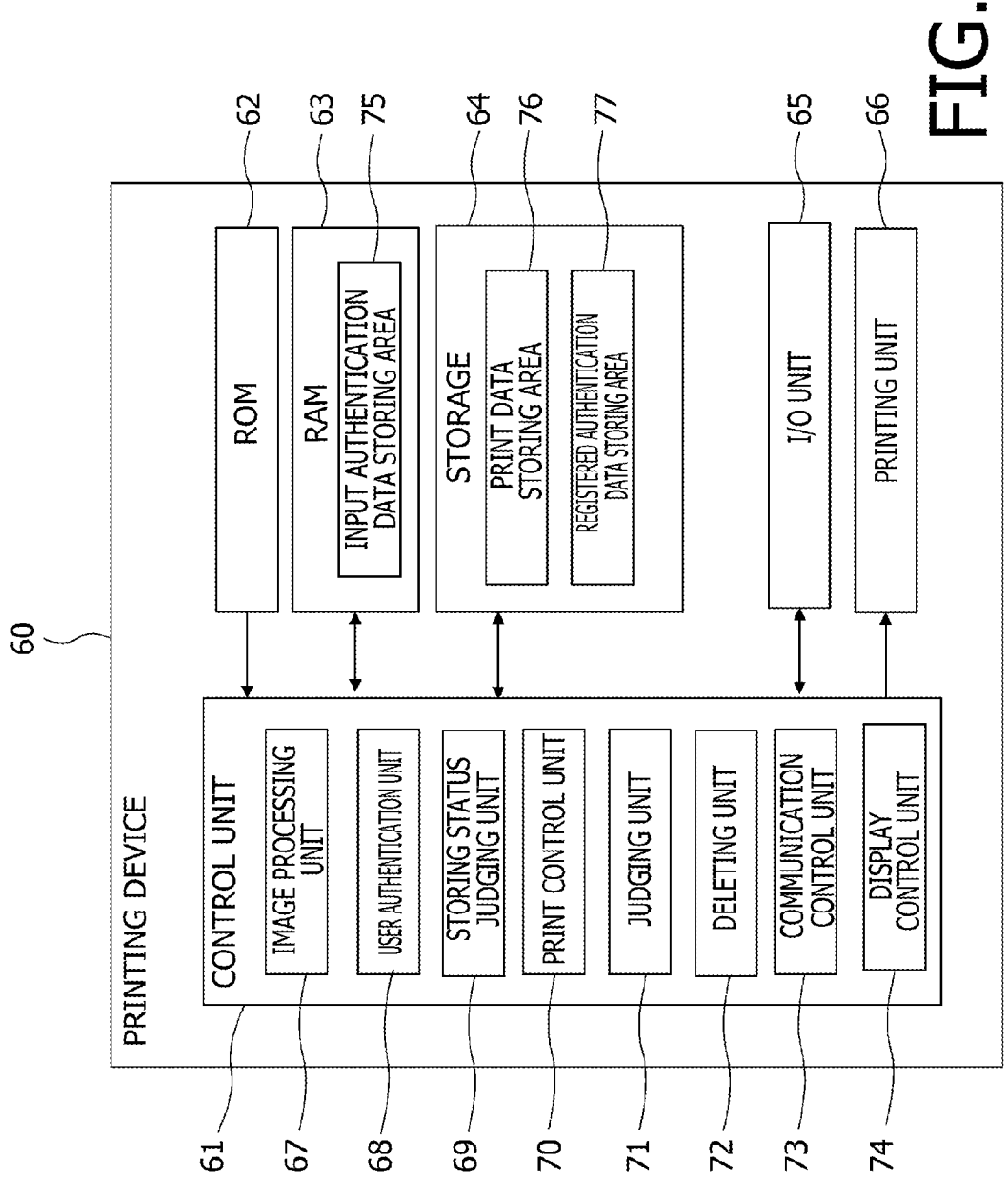

FIG. 9 is a block diagram showing a functional configuration of the printing device shown in FIG. 1.

Figure 10:
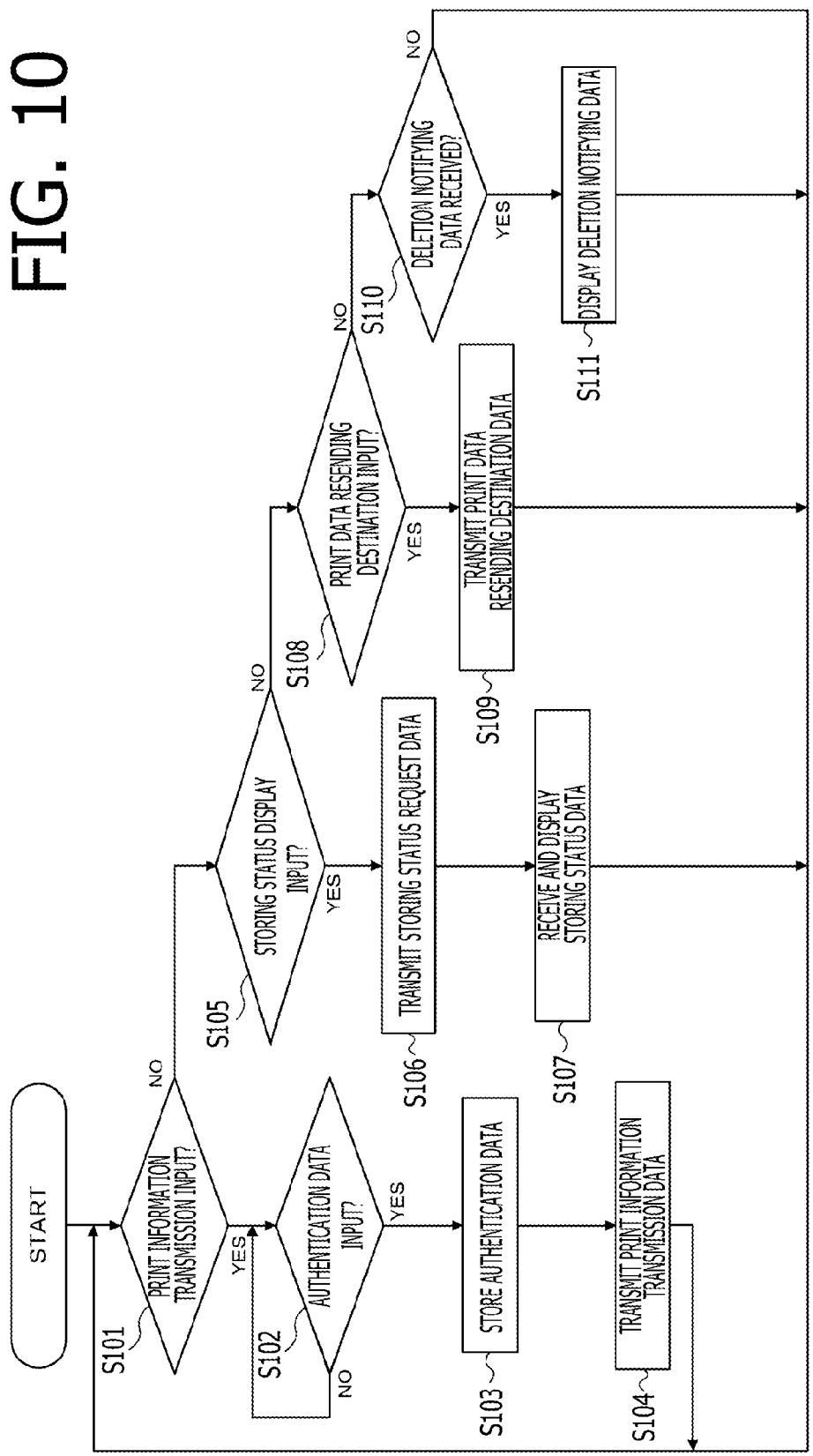

FIG. 10 show a flowchart illustrating a main process of the terminal device shown in FIG. 1.

Figure 11:
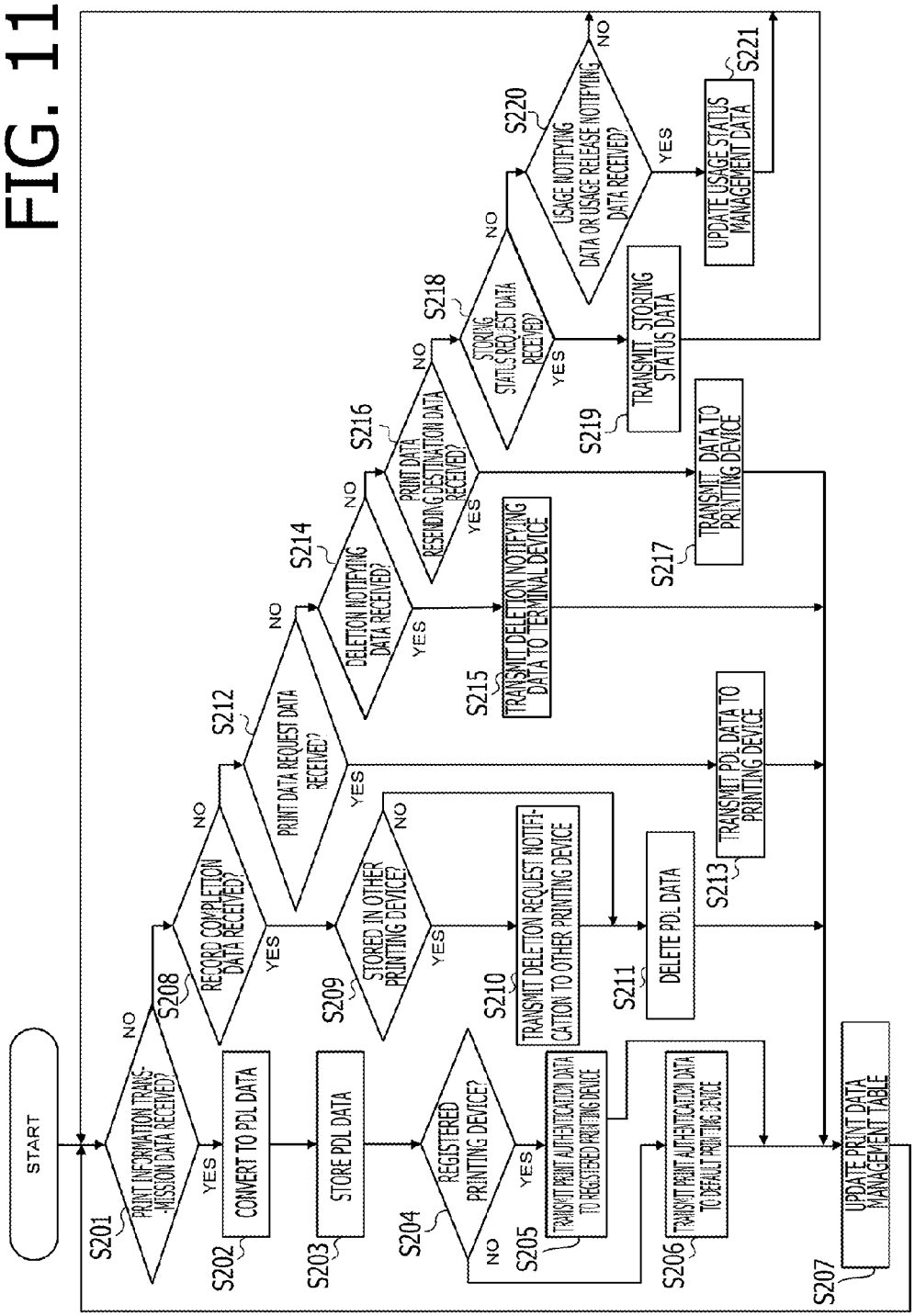

FIG. 11 show a flowchart illustrating a main process of the host device shown in FIG. 1.

Figure 12:
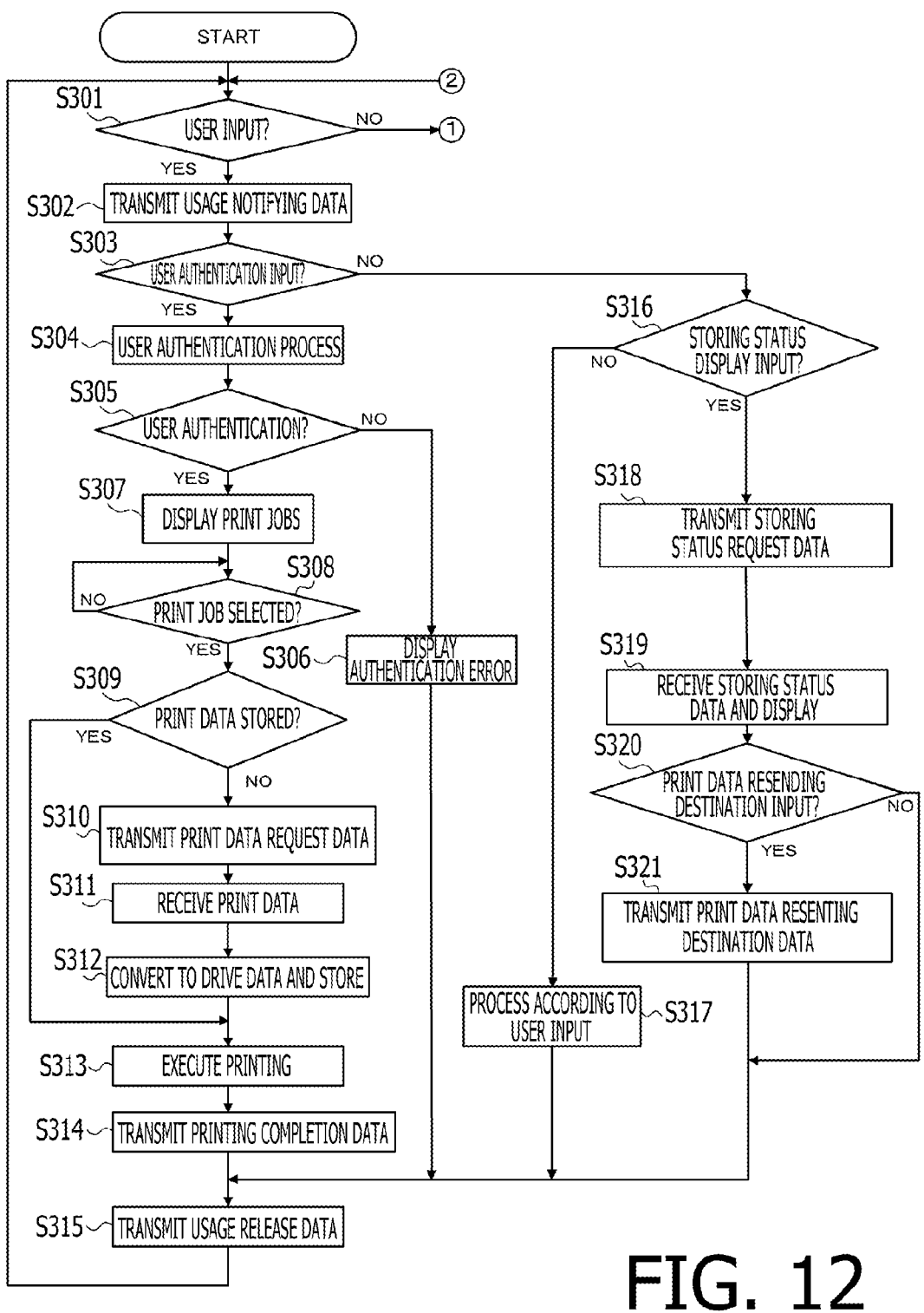
Figure 13:
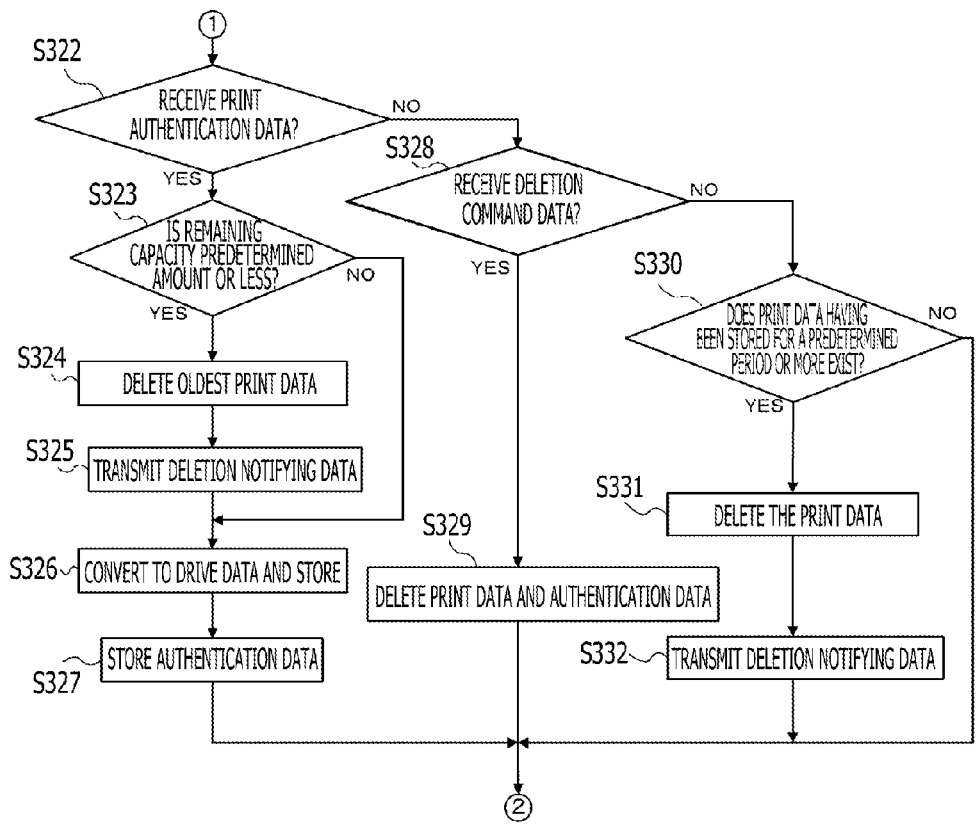

FIGS. 12 and 13 show a flowchart illustrating a main process of the printing device shown in FIG. 1.

DETAILED DESCRIPTION

Hereinafter, a printing system 1 according to an embodiment of the invention will be described with reference to the accompanying drawings.

The printing system, as shown in FIG. 1, includes a plurality of terminal devices 20, a host device 40 which is communicably connected with the plurality of terminal devices 20 through a network (WAN: wide area network, or LAN: local area network) 2, and a plurality of printing devices 60 which are communicably connected with the host device 40 through a LAN 2.

The terminal devices 20 may be PCs (personal computers), PDSs (personal digital assistants) and the like, which are configured to generate print data with use of software in accordance with user input, and transmits (upload) the generated print data to the host device 40. The host device 40 manages the print data received from the terminal devices 20, and transmits print data to predetermined printing devices 60. The printing devices 60 print out images based on the print data received from the host device 40 on printing sheets.

The printing system 1 employs a user authentication function. According to the embodiment, the printing system 1 acquires user input of authentication data at the printing device 60 when the printing device 60 requests the host device 40 for print data. After the user authentication is executed, the printing device 60 receives the print data from the host device 40, and prints out images represented by the received print data on the printing sheets.

Figure 2:
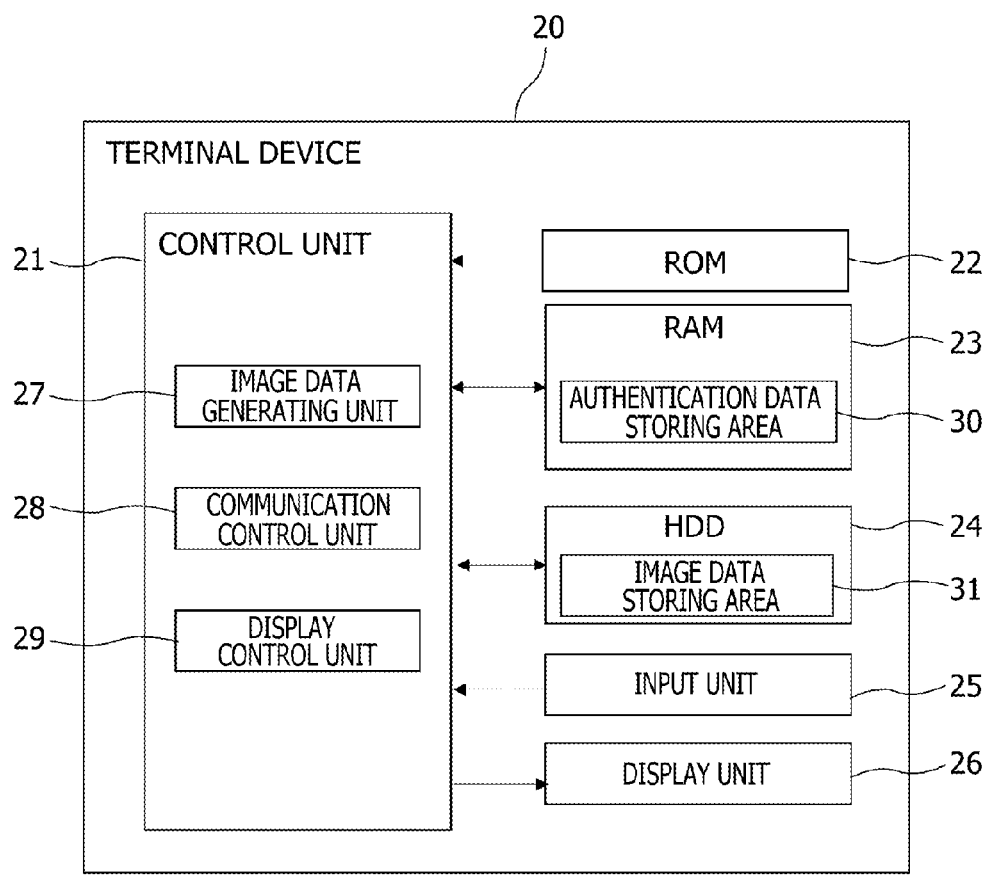
FIG. 2 is a block diagram of one of the terminal devices shown in FIG. 1.

The terminal device 20 is, for example, a PC (personal computer) which includes, as shown in FIG. 2, a control unit 21, a ROM (read only memory) 22, a RAM (random access memory) 23, an HDD (hard disk drive) 24, an input unit 25 and a display unit 26. The control unit 21 is provided with a CPU (central processing unit) that controls the entire operation of the terminal device 20. The ROM 22 stores control programs to be executed by the control unit 21. The programs include a program causing the control unit 21 to executed a process shown in FIG. 10. The RAM 23 includes an authentication data storing area 30, in which authentication data input by a user and identification information (hereinafter, also referred to as user ID) identifying the user who input the authentication data is stored temporarily in an associated manner when print information transmission input (which will be described later) is done.

It is noted that an input method of the authentication data does not need to be limited to the above, and various kinds of well-know methods such as a password input, input using a physical device such as an ID card can be employed optionally or alternatively. The HDD 24 has an image data storing area 31 in which print data generated by an image data generating unit 27 (described later) is temporarily stored. Further, the HDD 24 stores application software that generates print data representing images to be printed.

The input unit 25 includes a keyboard, a mouse, a reader which is configured to read authentication data stored in a physical device such as an ID card, and the like. The input unit 25 acquires the user's input of print information transmission input, storing status display request, input of resending destination of print data and the like, and transmits the thus acquired user's input to the control unit 21.

The print information transmission input is a user input of a command causing a terminal device 20 to transmit print data, which is generated by the terminal device 20 and stored in the image data storing area 31, to the host device 40 and the printer 60.

The storing status display input is a user input of a command causing the terminal device 20 to obtain information as indicated below from the host device 40 and display the same on the display unit 26. The information to be obtained includes:

information (hereinafter, occasionally referred to as print management information) of the printing device 60 in which print data which has already been transmitted to the host device 40 and the printing device 60 in response to user input of print information transmission input but the print request has not yet been made; and recoding status information including usage status of the printer 60 representing whether another user is currently inputting a command with respect to an I/O unit 65 (described later) of each of the printing devices 60.

The print data resending destination input is a user input causing the terminal device 20 to transmits print data stored in the PDL data storing area 49 of the host device 40 to one of user-convenient printing devices 60 in which the print data is not stored.

The display unit 26 includes an LCD (liquid crystal display), which displays various setting screens and/or messages in accordance with display data output by the display control unit 29.

The control unit 21 is provided with an image data generating unit 27, a communication control unit 28 and the display control unit 29 (see FIG. 2).

The image data generating unit 27 is configured to generate print data using application software stored in the HDD 24 in accordance with the user input through the input unit 25, and store the generated print data in the image data storing area 31.

The communication control unit 28 executes data communication with the host device 40 to transmit/receive various kinds of data. For example, the communication control unit 28 transmits the print information transmission data including the print data stored in the image data storing area 31 to the host device 40 if the input unit 25 receives the user input of print information transmission input. It should be noted that the print information transmission data includes header information, print data and authentication data (see FIG. 4A). The header information contains print data identification information (hereinafter, occasionally referred to as print data ID) which is unique ID information such as print data name or pointer assigned to each piece of print data, identification information of the terminal device 20 such as the IP address thereof (hereinafter, occasionally referred to as sending terminal device ID), the user ID indentifying the user who has made the print information transmission input. The print information transmission data includes authentication data which is registered with the print data. Specifically, the print information transmission data is authentication data which is input by the user when the print information transmission input is done and stored in the authentication data storing area 30.

It is noted that, if the printing device 60 to which the print data is transmitted has been registered (i.e., designated) when the input receiving unit 25 receives the print information transmission input by the user, destination identification information (hereinafter, occasionally referred to as destination printing device ID) is also contained in the header information. It is possible to register more than one destination printing device IDs.

The communication control unit 28 transmits storing status request data (see FIG. 4B), which includes a user ID representing the user who made the storing status display input and the sending terminal device ID if the input device 25 acquires the storing status display input by the user, to the display control unit 29.

If the input unit 25 acquires the print data resending destination input by the user, the communication control unit 28 transmits print data resending destination data (see FIG. 4B) including resending destination printing device ID representing the printing device 60 designated by the user, and the print data ID to the host device 40.

The display control unit 29 generates display data to be displayed on the display unit 26 based on the information received by the communication control unit 28 (e.g., storing status data, and the like), and displays the display data on the display unit 26.

The host device 40 includes, as shown in FIG. 6, a control unit 41, a ROM 42, a RAM 43 and a storage 44. The control unit 41 includes a CPU which controls the entire operation of the host device 40. The ROM 42 stores control programs to be executed by the control unit 41 and the like (including a program for the process shown in FIG. 11). The RAM 43 temporarily stores data received from the terminal device 20 or the printing device 60.

The storage 44 has a PDL data storing area 49, a print data management table storing area 50, a usage status management table storing area 51, and a default printing device storing area 52. In the PDL data storing area 49, the print data which is the PDL data converted by a PDL conversion unit 45, and the print data ID and the authentication data related to the print data are stored.

In the print data management table storing area 50, the print data management table as shown in FIG. 7 is stored. The print data management table shows the print data stored in the PDL data storing area 49, and the header information of the print information transmission data and information of the printing device 60 in which the print data is currently stored (i.e., the print management information), which are indicated for each piece of print data.

For example, in the print data management table shown in FIG. 8, the print management information A regarding the print data A stored in the PDL data storing area 49 shows that the user (identified by the user ID) who made the print information transmission input regarding the print data A is the user A, the terminal device 20 (identified by the terminal device ID) which transmitted the print data A is a terminal device A, the printing devices (identified by the printing device ID) which have been registered by the user as the destinations of the print data A are printing devices A, B and C. Further, the recording printing devices (identified by the recording printing device ID) in which the print data A is currently stored is the printing devices A and C. The print data management table is updated under control of the data table management unit 48.

In the usage status management table storing area 51, the usage status management table as shown in FIG. 8 is stored. The usage status management table shows information representing whether a user is currently executing an operational input through an I/O unit 65 of the printing device 60 (i.e., whether the printing device 60 is currently used or not) for each printing device 60. The printing devices of which printing device IDs are indicated in a cell of the used printing device are currently used by the users, while the printing devices 60 of which printing device IDs are indicated in a cell of the available printing device are not currently used by the users. For example, in the example of shown in FIG. 5, the currently used printing devices (used printing device IDs) are printing devices A, D, F and G, while the printing devices which are not currently used (available printing device IDs) are printing devices B, C and E. As mentioned above, the usage status management table is updated under control of the data table management unit 48.

In the default printing device storing area 52, default destination identification information (hereinafter, occasionally referred to as default destination printing device ID) representing at least one printing device 60 which can be a destination printing device if the print information transmission data received from the terminal device 20 does not contain the destination printing device ID. The default destination printing device IDs may be stored in the default printing device storing area 52 in relation to respective users (user IDs) or respective terminal devices 20 (terminal device IDs). Optionally, the default destination printing device ID(s) stored in the default printing device storing area 52 may be changed in accordance with the user input acquired by the terminal device 20 or the printing device 60.

The control unit 41 includes a PDL data conversion unit 45, a communication control unit 46, a deletion unit 47 and a data table management unit 48.

The PDL conversion unit 45 is configured to convert the print data included in the print information transmission data received by the communication control unit 46 into PDL data which is data described in the PDL (Page Description Language) which can be interpreted by the printing device 60.

The communication control unit 46 executes data communication with the terminal devices 20 and the printing devices 60. The communication control unit 46 further executes data storing operation for storing data received from the terminal devices 20 and the host device 40 to the storage 44. For example, when the communication control unit 46 receives the print information transmission data (see FIG. 4A) from the terminal device 20, the communication control unit 46 converts the print data contained in the print information transmission data to the PDL data with the PDL data conversion unit 45, and stores the print data (which has been converted to the PDL data) together with the print data ID and authentication data, in the PDL data storing area 49, in associated manner. Further, the communication control device 46 transmits print authentication data (see FIG. 4E) containing the print data converted into the PDL data, the print data ID, the authentication data and the user ID to the printing device 60 before the user authentication executed in the printing device 60.

Since the data transmitted from the host device 40 to the printing device 60 is the PDL data which is relatively small in size, a data transmission time period for transmitting the print data (i.e., the print authentication data) to the printing device 60 can be shortened. If the header information of the print information transmission data includes the destination printing device ID, the communication control unit 46 transmits the print authentication data to the printing device 60 identified by the destination printing device ID. If the header information of the print information transmission data includes a plurality of destination printing device IDs, the print authentication data is transmitted to each of the plurality of printing devices 60 respectively identified by the plurality of destination printing device IDs. If the header information of the print information transmission data does not include the destination printing device ID, the communication control unit 46 transmits the print authentication data to the default printing device 60 which is identified by the default destination printing device ID stored in the default printing device storing area 52.

When the communication control unit 46 receives, from the printing device 60, print data request data (see FIG. 4F) requesting the host device 40 to transmit the print data stored in the PDL data storing area 49, the communication control unit 46 transmits the print data identified by the print data ID that is contained in the print data request data to the printing device 60 which is identified by the sending printing device ID.

When the communication control unit 46 receives, from the terminal device 20 or the printing device 60, print data resending destination data (see FIG. 4D), the communication control unit 46 transmits the print authentication data (see FIG. 4E), which contains the print data (PDL data) which is identified by the print data ID contained in the received print data resending destination data and is stored in the PDL data storing area 49, the print data ID identifying the print data to be sent, the user ID and authentication data, to the printing device 60 identified by the resending destination printing device ID which is also contained in the print data resending destination data.

When the communication control unit 46 receives, from the terminal device 20 or the printing device 60, the storing status request data (see FIG. 4B), the communication control unit 46 refers to the print data management table (see FIG. 7) stored in the print data management table storing area 50 and extracts print management information corresponding to the user ID contained in the received storing status request data. For example, if the user ID represents user A (see FIG. 7), the print management information corresponding to user A (i.e., the print management information A and print management information B to which "user A" is assigned) are extracted. Then, the communication control unit 46 transmits the storing status data (see FIG. 4C) containing the extracted print management information and the usage status data containing the usage status management table stored in the usage status management table storing area 51 to the terminal device 20 identified by the sending terminal device ID or the printing device 60 identified by the sending printing device ID.

When the communication control unit 46 receives the printing completion data (see FIG. 4G) representing completion of the recording of the image corresponding to the print data on the recording medium (e.g., printing sheet) from the printing device 60, the communication control unit 46 refers to the print data management table stored in the print data management table storing area 50 and transmits deletion command data instruction to delete the print data (see FIG. 5A) to printing devices 60 which are printing devices other than the print device 60 which has transmitted the printing completion data, and store the same print data.

When the communication control unit 46 receives the print completion data from the printing device 60, the deletion unit 47 deletes the print data identified by the print data ID contained in the print completion data, and print data ID and authentication data, which are associated with the print data, from the PDL data storing area 49. As above, since the print data of which printing on the printing sheets has been completed is deleted from the PDL data storing area 49, possibility of leakage of information can be reduced, and further, available capacity of the PDL data storing area 49 can be kept.

The data table management unit 48 updates the print data management table stored in the print data management table storing area 50, and the usage status management table stored in the usage status management storing area 51, in accordance with the data communication executed between the communication control unit 46 and the printing devices 60.

The printing device 60 is provided with a control unit 61, a ROM 62, a RAM 63, a storage 64, an I/O unit 65 and a printing unit 66 (see FIG. 9).

The control unit 61 has a CPU which controls entire operation of the printing device 60. The ROM 62 stores programs (including programs for a process shown in FIGS. 12 and 13) to be executed by the control unit 61. The RAM 63 temporarily stores data received from the host device 40. The RAM 63 has an input authentication data storing area 75 in which authentication data which is input by the user and used for user authentication, is temporarily stored.

The storage 64 has a print data storing area 76 and a registered authentication data storing area 77. In the print data storing area 76, drive data, which is data converted by an image processing unit 67 from the print data, is stored together with print data ID which is associated with the print data (drive data). In the registered authentication data storing area 77, the authentication data that is included in the print authentication data is stored together with the user ID and the print data ID in an associated manner.

The I/O unit 65 is provided with a displaying device and a touch panel provided thereon. The displaying device displays, based on the display data transmitted from a display control unit 74 of the control unit 61, various setting screens, messages, a list of print jobs and the like. The I/O unit 65 acquires user inputs such as print data selection input, user authentication input, storing status display input, print data resending destination input and the like, and transmits the user inputs to the control unit 61. The I/O unit 65 may be provided with a card reader having a function of reading authentication data stored in an ID card the user has.

The user authentication input is a user operation of the I/O unit 25 to input authentication data assigned to the user. The print data selection input is a user operation of the I/O unit 25 to select a print data ID that identifies the print data to be printed by the printing unit 66 from a print data ID list (i.e., a list of print jobs) which are associated with the user ID of the present user. The print data ID is stored in the registered authentication data storing area 77 when the user authentication is successfully completed by a user authentication unit 68.

The printing unit 66 prints an image represented by the print data stored in the print data storing area 76, based on the print control data output by a print control unit 70, on the printing sheets.

The control unit 61 includes an image processing unit 67, the user authentication unit 68, a storing status judging unit 69, the print control unit 70, a judging unit 71, a deletion unit 72, a communication control unit 73 and the display control unit 74.

The image processing unit 67 converts the print data (PDL data) contained in the print authentication data, which has been transmitted from the host device 40 and received by the communication control unit 73, to drive data for the printing unit 66.

For example, if the printing unit 66 has an inkjet head, the drive data represents amount of ink ejected by the inkjet head for each unit area of the printing sheet. The print data (PDL data) may be converted in accordance with a well-known error diffusion process. When converted to the drive data, a process for converting data into multi-level data may be executed.

If the printing unit 66 is a laser beam printer, the print data (PDL data) may be converted to the drive data for a laser recording unit in accordance with a dithering process and the like. It should be noted that the drive data may include not only amount data (i.e., so-called print data representing the amount of ink or density value) for each unit area of the recording sheet, but also data used for driving the movement of the printing unit 66.

The user authentication unit 68 executes user authentication by judging whether the authentication data stored in the input authentication data storing area 75 matches the authentication data stored in the registered authentication data storing area 77.

The storing status judging unit 69 judges, when the I/O unit 65 acquires the print data selection input, whether the print data designated by the print data selection input is stored in the print data storing area 76. If it is judged that the print data designated by the print data selection input is stored in the print data storing area 76, a print start command is sent to the print control unit 70. If it is judged that the print data designated by the print data selection input is not stored in the print data storing area 76, a print data request command containing the print data ID of the designated print data is sent to the communication control unit 73 to obtain the print data, which meets the data selection input, from the host device 40. Thereafter, when the print data is obtained from the host device 40 and stored in the print data storing area 76, the print start command is transmitted to the print control unit 70.

When the print start command is received from the storing status judging unit 69, the print control unit 70 transmits the print control data to the printing unit 66 so that an image corresponding to the print data designated by the print start command and stored in the print data storing area 76 is printed on the recording sheet.

The judging unit 71 judges whether the print data stored in the print data storing area 76 is to be deleted before a print request regarding the print data is received. Specifically, according to the embodiment, the judging unit 71 judges that print data is to be deleted if the print data was stored in the print data storing area 76 and a print request regarding the print data has not been printed within a predetermined period. With this configuration, leakage of the print data via the printing device 60 is prevented, and at the same time, the print data storing area 76 is used efficiently. It should be noted that the predetermined period may be set by the user in association with the print data when the user inputs the print data request at the terminal device 20. The print request is a trigger, upon receipt thereof the control unit 61 controls the printing unit 66 to start printing based on the print data, and the reception process, executed by the control unit 61, of the print data selection input through the I/O unit 25 is regarded as the print request discussed above.

When the remaining capacity of the pint data storing area 76 is less than a predetermined amount, the judging unit 71 judges that the oldest piece of the print data stored in the print data storing area 76 is to be deleted. Therefore, even if the remaining capacity of the print data storing area 76 becomes small, it is possible to execute the print request with respect to the newest piece of print data received from the host device 40. It is noted that, according to the embodiment, the judging unit 71 is configured to judge that the print data stored earliest (i.e., the oldest print data) is to be deleted. However, it is only an example and it can be modified such that a piece of print data is judged to be deleted based on a certain criteria. For example, the less important piece of print data among a plurality of pieces of print data stored in the print data storing area 76 may be judged to be deleted.

The deletion unit 72 deletes the print data that is judged, by the judging unit 71, to be deleted and the print data ID associated therewith. The deletion unit 72 also deletes the print data which has already been printed as the printing operation has been executed by the printing unit 66 from the print data storing area 76. The deletion unit 72 also deletes the authentication data associated with the print data, which has been printed, from the registered authentication data storing area 77. With the above configuration, possibility of information leakage is lowered, and further, the remaining capacity of the print data storing area 76 can be increased.

Further, when the communication control unit 73 receives deletion command data (see FIG. 5A) from the host device 40, the deletion unit 72 deletes the print data associated with the print data ID contained in the deletion command data from the print data storing area 76 and deletes the same. Further, the deletion unit 72 deletes the authentication data associated with the print data ID from the registered authentication data storing area 77 and deletes the same.

The communication control unit 73 executes various data communications with the host device 40 and data storing process of storing data received from the host device 40. For example, when the print authentication data (see FIG. 4E) is received from the host device 40, the communication control unit 73 controls the image processing unit 67 to convert the print data contained in the print authentication data to the drive data, and then, stores the drive data (converted from the print data) in the print data storing area 76 in association with the print data ID. The communication control unit 73 further stores the authentication data contained in the print authentication data in the registered authentication data storing area 77 in association with the user ID and the print data ID. Since the print data stored in the print data storing area 76 is the drive data for the printing device 60 generated by developing the PDL data, a printing operation can be executed quickly in response to the print request.

When the printing of the image represented by the print data by the printing unit 66 is completed, the communication control unit 73 transmits printing completion data containing the print data ID identifying the print data which has been printed, and sending printing device identification data identifying the printing device 60 (i.e., the sending printing device ID) to the host device 40. Further, when the deletion unit 72 deletes the print data which is judged to be deleted by the judging unit 71, the communication control unit 73 transmits deletion notifying data (see FIG. 5B) containing the print data ID of the print data which has been deleted and the sending printing device ID to the host device 40. When the print request command is received from the recording stats judging unit 69, the communication control unit 73 transmits print data request data (see FIG. 4F) containing print data ID indicated by the print request command and the sending printing device ID to the host device 40.

FIG. 10 shows a flowchart illustrating a main process for the terminal device 20. The control unit 21 judges whether the input unit 25 has acquired print information transmission input from the user (S101). If the print information transmission input has been acquired (S101: YES), the control unit 21 judges whether the authentication data has been input by a user (S102). If the authentication data has not been input (S102: NO), the control unit 21 repeats the judgment in S102.

If it is judged that the authentication data has been input (S102: YES), the control unit 21 stores the acquired authentication data in the authentication data storing area 30 (S103). Then, the communication control unit 28 transmits the print information transmission data which includes print data generated by the image data generating unit 27 and stored in the image data storing area 31, the header information, and the authentication data stored in the authentication data storing area 30 to the host device 40 (S104). Then, control returns to S101. It is noted that the authentication data stored in the authentication data storing area 30 is deleted after the print information transmission data has been transmitted to the host device 40.

If it is judged that the print information transmission input has not been acquired (S101: NO), the control unit 21 judges whether the storing status display input has been made through the I/O unit 25 by the user (S105). If the storing status display input has been acquired (S105: YES), the communication control unit 28 transmits the storing status request data (see FIG. 4B) which includes the user ID identifying the user who made the storing status display input and the sending terminal device ID to the host device 40 (S106). Next, the communication control unit 28 receives the storing status data from the host device 40. Based on the thus received storing status data, the display control unit 28 generates display data and displays the same on the display unit 28 as shown in FIG. 3 (S107). With this configuration, the user can print images on the printing sheet using a desired printing device 60 from among a plurality of printing devices 60 which are not currently printing images. When S107 is executed, control returns to S101.

If control judges that the storing status display input is not received (S105: NO), control judges whether the input unit 25 has received print data resending destination input (S108). If it is judged that the print data resending destination input has been made (S108: YES), the communication control unit 28 transmits print data resend destination data (see FIG. 4D), which includes resending destination printing device ID indicative of the printing device 60 as the resending destination, and the print data ID indicative of print data to be transmitted from the host device 40, to the printing device 60. Thereafter, control returns to S101.

If it is judges that the print data resenting destination input has not been acquired (S108: NO), the communication control unit 28 judges whether deletion notifying data (see FIG. 5B) is received from the host device 40 (S110). If it is judged that the deletion notifying data has not been received (S110: NO), the control unit 21 returns to S101.

If the deletion notifying data has been received (S110: YES), the display control unit 29 generates display data regarding the deleted print data and the printing device 60 in which the print data has been deleted, and causes the display unit 26 to display the thus generated display data (S111). Thereafter, control returns to S101. As above, the user can recognize information regarding the print data (print data ID) which is deleted before the print request is made and the printing device 60 (printing device ID) in which the print data has been deleted, on the display unit 26 of the terminal device 20.

FIG. 11 is a flowchart illustrating a control process of the host device 40. In S201, it is judged whether the communication control unit 46 has received print information transmission data (see FIG. 4A) from one of a plurality of terminal devices 20. If it is judged that the communication control unit 46 has received the print information transmission data (S201: YES), the PDL data conversion unit 45 converts the print data contained in the print information transmission data to PDL data (S202). Then, the communication control unit 46 stores the print data that has been converted to the PDL data by the PDL data conversion unit 45 in the PDL data storing area 49 in association with the print data ID and the authentication data which correspond to the converted print data (S203). Next, the communication control unit 46 judges whether the header information of the print information transmission data contains the destination device ID (S204). If the destination device ID is contained (S204: YES), the communication control unit 46 transmits print authentication data (see FIG. 4E) to the printing device 60 identified by the destination device ID (S205). Then, control proceeds to S207. If the destination device ID is not contained in the header information (S204: NO), the communication control unit 46 transmits the authentication data to the printing device 60 that is indicated by the default destination device ID stored in the default printing device storing area 52 (S206), and control proceeds to S207.

If it is judged that the print information transmission data has not been received (S201: NO), the communication control unit 46 judges whether printing completion data (see FIG. 4G) has been received from one of the plurality of printing devices 60 (S208). If it is judged that the printing completion data has been received (S208: YES), the communication control unit 46 judges whether the print data identified by the print data ID that is contained in the printing completion data is currently stored in printing devices 60 other than the printing device 60 which has transmitted the printing completion data (S209). Specifically, the communication control unit 46 refers to the print management information regarding the print data ID contained in the printing completion data, and if there exists printing device ID which is different from the sending printing device ID contained in the printing completion data, the communication unit 46 determines that the print data identified by the print data ID contained in the printing completion data is currently stored in another printing device 60.

If the communication control unit 46 judges that the print data identified by the print data ID contained in the printing completion data is not stored in another printing device 60 (S209: NO), control proceeds to S211. If it is judged that the print data identified by the print data ID contained in the printing completion data is stored in another printing device 60 (S209: YES), the communication control unit 46 transmits the deletion command data (see FIG. 5A) containing the print data ID which is contained in the recoding completion data to another device 60 (S210). With this configuration, if one of the printing devices 60 that receives the print data prints an image represented by the print data, the print data is deleted from the print data storing areas 76 of all the printing devices 60 that receive the same print data. Therefore, leakage of information can be suppressed. After execution of S210, control proceeds to S211.

In the process of S211, the deletion unit 47 deletes the print data identified by the print data ID contained in the printing completion data, and the print data ID identifying the deleted print data, and the authentication data thereof from the PDL data storing area 49. After execution of S211, control proceeds to S207.

In S208, if it is judged that the printing completion data has not been received (S208: NO), the communication control unit 46 judges whether the print data request data (see FIG. 4F) is received from one of the plurality of printing devices 60 (S212). If it is judged that the print data request data is received (S212: YES), the communication control unit 46 extracts the print data identified by the print data ID contained in the received print data request data, and transmits the extracted print data to the sending printing device 60 indicated in the print data request data (S213). Then, control proceeds to S207.

If it is judged that the print data request data has not been received (S212: NO), the communication control unit 46 judges whether the deletion notifying data (see FIG. 5B) has been received from one of the plurality of printing devices 60 (S214). If it judged that the deletion notifying data has been received (S214; YES), the communication control unit 46 transfers the deletion notifying data to the terminal device 20 which is a sender of the print data identified by the print data ID contained in the deletion notifying data (S215). Specifically, the communication control unit 46 refers to the print management information regarding the print data ID contained in the deletion notifying data in the print data management table stored in the print data management table storing area 50, and transmits the deletion notifying data to the terminal device 20 identified by the sending terminal device ID. After execution of the above process, control proceeds to S207.

If it is judged that the deletion notifying data has not been received (S214: NO), the communication control unit 46 judges whether the print data resending destination data (see FIG. 4D) is received from one of the plurality of terminal devices 20 or one of the plurality of printing devices 60

(S216). If it is judged that the print data resending destination data has been received (S216: YES), the communication control unit 46 extracts the print data indentified by the print data ID contained in the print data resending destination data and the authentication data regarding the print data from the PDL data storing area 49, and transmits the print authentication data including the extracted print data and the authentication data (see FIG. 4E) to the printing device 60 identified by the resending destination printing device ID (S217). It is noted that, if the communication control unit 46 had already transmitted the print authentication data to the printing device 60 identified by the resending destination printing device ID and the authentication data has already been stored in the registered authentication data storing area 77 of the printing device 60, the authentication data may be excluded from the print authentication data.

In S207, the data table management unit 48 updates the print data management table stored in the print data management table storing area 50. Specifically, for example, if the communication control unit 46 has transmitted the print data (e.g., print authentication data etc.) to the printing device 60, the destination printing device ID of the printing device 60 to which the print data has been transmitted is additionally registered as an item of recorded printing device in the print management information regarding the print data (print data ID). If the communication control unit 46 has received the printing completion data from the printing device 60, the print management information regarding the print data ID contained in the received printing completion data is deleted from the print data management table. Further, if the communication control unit 46 has received the deletion notifying data from the printing device 60, the destination printing device ID of the printing device 60 which has sent the deletion notifying data is deleted from the item of the recorded printing device 60 in the print management information regarding the print data ID contained in the received deletion notifying data.

If it is judged that the print data resending destination data has not been received (S216: NO), the communication control unit 46 judges whether storing status request data (see FIG. 4B) is received from one of the plurality of terminal devices 20 or one of the plurality of printing devices 60 (S218). If it is judged that the storing status request data has been received (S218: YES), the communication control unit 46 transmits the recoding status data (see FIG. 4C) which includes the print management information regarding the user ID represented by the received storing status request data, and the usage status management table stored in the usage status management table storing area 51 to the terminal device 20 identified by the sending terminal device ID or the printing device 60 identified by the sending printing device ID included in the storing status request data (S219), the control returns to S201.

If it is judged that the storing status request data has not been received (S218: NO), the communication control unit 46 judges whether usage notifying data (see FIG. 5C9 notifying that the user starts using the printing device 60 or usage release notifying data (see FIG. 5D) notifying that the user completed to use the printing device 60 is received from one of the plurality of printing devices 60 (S220). If the communication control unit 46 has not received the usage notifying data or usage release notifying data (S220), control returns to S201.

If the communication control unit 46 has received the usage data or the usage release notifying data (S220: YES), the data table management unit 48 updates the usage status management table stored in the usage status management table storing area 51 based on the sending printing device ID contained in the usage notifying data or usage release notifying data (S221). Specifically, when the usage notifying data is received, the sending printing device ID contained in the usage notifying data, which is indicated to be not busy, is changed to be busy. If the usage release notifying data is received, the sending printing device ID contained in the usage release notifying data, which is indicated to be busy, is changed to be not busy. With this configuration, the host device 40 can manage the usage status of each of the printing devices 60. When S221 has been executed, control returns to S201.

FIGS. 12 and 13 show a control process of the printing device 60. In S301, the control unit 21 judges whether the I/O unit 65 has acquired a user input. If the user input has been acquired (S301: YES), the communication control unit 73 transmits the usage notifying data (see FIG. 5C) containing the sending printing device ID which is the indentifying information of the printing device 60 to the host device 40 (S302). Then, the control unit 61 judges whether the user input acquired by the I/O unit 65 is user authentication input (S303). If it is judged that the user input is the user authentication input (S303: YES), the authentication data regarding the user authentication input is stored in the input authentication data storing area 75. Then, the user authentication unit 68 executes user authentication by comparing the authentication data stored in the registered authentication data storing area 77 with the authentication data stored in the input authentication data storing area 75 (S304). Specifically, the user authentication unit 68 extracts the authentication data associated with the user ID of the user who has executed the user authentication input from among a plurality of pieces of authentication data stored in the registered authentication data storing area 77, and searches for the data that matches the authentication data stored in the input authentication data storing area 75. If there is data that matches the user authentication data stored in the input authentication data storing area 75, it is judged that the authentication is successfully completed, otherwise, the authentication is judged to be failed. with the above configuration, leakage of the pint data can be suppressed.

If the authentication by the user authentication unit 68 is failed (S305: NO), the display control unit 70 displays display data indicating the authentication (S306), then process proceeds to S315. If the user authentication is successfully completed (S305: YES), the display control unit 74 displays a list of print data IDs (print jobs) associated with the authentication data used for the user authentication and stored in the user authentication (S307).

Next, the control unit 61 judges whether the I/O unit 65 has acquired print data selection input (S308). If the print data selection input has not been acquired (S308: NO), process returns to S308. If it is judged that the print data selection input has been acquired (S308: YES), the storing status judging unit 69 judges whether the print data identified by the print data selection input has been stored in the print data storing area 76 (S309). If the print data is stored (S309: YES), the storing status judging unit 69 transmits the print start command to the print control unit 70, and control proceeds to S313.

If it is judged that the print data is not stored (S309: NO), the storing status judging unit 69 transmits print transmission request command to the communication control unit 73. Then, the communication control unit 73 transmits print data request data (see FIG. 4F) which includes the print data ID identified by the print data request command, and sending printing device ID, which is the identifying information of the printing device 60, to the host device 40 (S310), and receives the print data from the host device 40 (S311). Next, the communication control unit 73 converts the received print data to the drive data using the image processing unit 67, and stores the print data, which has been converted to the drive data, in the print data storing area 76. Then the storing status judging unit 69 transmits the print start command to the print control unit 70 (S312), and control proceeds to S313.

In S313, the print control unit 70 records the image represented by the print data, which corresponds to the print start command and stored in the print data storing area 76 on the recording medium. After completion of the image recording on the recording medium, the communication control unit 73 transmits the printing completion data containing the print data ID identifying the print data and the sending printing device ID which is the identifying information of the printing device 60 (see FIG. 4G) to the host device 40 (S314). Then, control proceeds to S315.

If it is judged that the user input acquired by the I/O unit 65 is not the user authentication input (S303: NO), the control unit 61 judges whether the acquired user input is the storing status display input (S316). If it is judged that the acquired user input is not the storing status display input (S316: NO), the control unit 61 executes a process corresponding to the user input (S317), and control returns to S315.

If it is judged that the user input acquired by the I/O unit 65 is the storing status display input (S316: YES), the communication control unit 73 transmits the storing status request data (see FIG. 4B) including the user ID of the user who made the storing status display input to the host device 40 (S318). Next, the communication control unit 73 receives the storing status data (see FIG. 4C) from the host device 40. The display control unit 74 generates display data based on the received storing status data and controls the I/O unit 65 to display (S319). Next, the control unit 61 judges whether the I/O unit 65 has received the print data resending destination input by the user (S320). If the control unit 61 judges that the print data resending destination input is not received (S320: NO), process proceeds to S315. If the control unit 61 judges that the print data resending destination input has been received (S320: YES), the communication control unit 28 transmits the print data resending data (see FIG. 4D) which contains the destination printing device ID identifying the destination of the print data and the print data ID identifying the print data, which is to be transmitted from the host device 40 to the printing device 60, to the host device 40 (S321), and process proceeds to S315.

In S315, the communication control unit 28 transmits the usage release notifying data (see FIG. 5D) which contains the sending printing device ID identifying the printing device 60 itself to the host device 40. After execution of S315, process returns to S301.

If the control unit 61 judges that the user input has not been acquired (S301: NO), it is judged whether the communication control unit 73 has received the print authentication data (see FIG. 4E) from the host device 40 (S322). If it is judged that the host device 40 has received the print authentication data (S322: YES), the judging unit 71 judges whether the remaining capacity of the print data storing area 76 is less than a predetermined amount (S323). If it is judged that the remaining capacity of the print data storing area 76 is not less than the predetermined amount (S323: NO), control proceeds to S326.

If it is judged that the remaining capacity of the print data storing area 76 is less than the predetermined amount (S323: YES), the deletion unit 72 deletes the oldest print data (i.e., the print data which was stored earliest) among the pieces of print data stored in the print data storing area 76 (S324). Then, the communication control unit 73 transmits the deletion notifying data (see FIG. 5B) containing the print data ID identifying the deleted print data and the sending printing device ID which is the identifying information of the printing device 60 itself to the host device 40 (S325). Thereafter, control proceeds to S326.

In S326, the communication control unit 73 controls the processing unit 67 to convert the print data contained in the received print authentication data to drive data. Then, the print data as converted into the drive data is stored in the print data storing area 76 in association with the print data ID identifying the print data. Next, the communication control unit 73 stores the authentication data contained in the received print authentication data in association with the user ID and the print data ID in the registered authentication data storing area 77 (S327). Then, process returns to S301. It is noted that the authentication data stored in the registered authentication data storing area 77 contains the user ID and the print data ID.

If it is judged that the print authentication data has not been received from the host device 40 (S322: NO), the communication control unit 73 judges whether the deletion command data (see FIG. 5A) is received from the host device 40 (S328). If it is judged that the deletion command data has been received (S328: YES), the deletion unit 72 deletes the print data identified by the print data ID, which is contained in the deletion command data, from the print data storing area 76. Further, the deletion unit 72 deletes the authentication data associated with the print data ID from the registered authentication data storing area 77 (S329). Thereafter, process returns to S301.

If it is judged that the deletion command data has not been received (S328: NO), the judging unit 71 judges whether there is data which has been stored in the print data storing area 76 for more than a predetermined period (S330). If it is judged that such data does not exist (S330: NO), control returns to S301. If it is judged that there is data which has been stored in the print data storing area 76 for more than the predetermined period (S330: YES), the deletion unit 72 deletes such print data from the print data storing area 76 (S329), and the communication control unit 73 transmits the deletion notifying data (see FIG. 5B) which contains the print data ID identifying the deleted print data and the sending printing device ID identifying the printing device 60 itself to the host device 40 (S331). Thereafter, control returns to S301.

As described above, according to the embodiment, since the print data is stored in the print data storing area 76 of the printing device 60, it is possible to shorten a time period between the user input of the authentication data at the printing device 60 and execution of printing the image represented by the print data on the recording medium, in comparison with a conventional case where the print data is transmitted to the printing device after authentication is done in the terminal device. Further, since the print data is stored both in the PDL data storing area 49 of the host device 40 and the print data storing area 76 of the printing device 60, if the print data storing area 76 runs short of the remaining capacity, it is only necessary to delete the print data from the print data storing area 76, and it is unnecessary to execute a communication process for evacuating the print data to the host device 40 or the like. Therefore, data communication between the printing device 60 and the host device 40 can be simplified.

Further, since the print data can be transmitted to a plurality of printing devices 60, the user can select a desired one of the plurality of printing device 60 to which the print data has been transmitted depending on the user's convenience.

According to the above embodiment, the user authentication is executed by the user authentication unit 68 of the printing device 60. This can be modified such that the user authentication is performed by the host device 40. In such a case, the authentication data input by the user at the printing device 60 may be transmitted to the host device 40. Then, a user authentication unit provided to the host device 40 may execute the user authentication by comparing the authentication data transmitted from the printing device 60 with the authentication stored in the PDL data storing area 49 of the host device 40. Thereafter, the result of comparison (i.e., the authentication result) may be transmitted from the host device 40 to the printing device 60. With such a configuration, it becomes unnecessary to provide the user authentication unit in the printing device 60, which simplifies the structure of the printing device 60. Alternatively, the terminal device 20 may be configured to execute the user authentication.

According to the exemplary embodiment, each piece of the print data is associated with the authentication data (i.e., registered). However, the authentication data may be associated with each user. Specifically, the authentication data assigned to each user may be preliminarily stored in the printing device 60 or the host device 40, and the thus stored authentication data may be compared with user-input authentication data which is input at the printing device 60 to execute the user authentication. That is, the user authentication may be executed by comparing the authentication data which is assigned to each user and preliminarily stored in the recording system 1 with the user-input authentication data through the printing device 60.

The above-described embodiment may be modified such that when the judging unit 71 judges to delete the print data, the authentication data associated with the print data is also deleted from the registered authentication data storing area 77. For realizing such a modification, if the host device 40 receives the print data request data from the printing device, the host device 40 may transmit the authentication data together with the print data indicated by the print data request data to the printing device 60. In such a modification, since the authentication data is not stored in the registered authentication data storing area 77 of the printing device 60 for a long period, leakage of the authentication data can be suppressed.

In the above-described embodiment, after the user authentication, a list of print data IDs (print jobs) is displayed on the display unit 26. Then, when the user select one of the listed print data IDs, recording of the image represented by the print data identified by the selected print data ID on the recording medium is started. Such a configuration may be modified as indicated below. That is, according to the modified embodiment, a list of print data IDs associated with the user ID of the user who is currently executing the user input, and stored in the registered authentication data storing area 77 is displayed on the display unit 26. When the user selects one of the displayed print data IDs, the user authentication input regarding the authentication data associated with the selected print data ID is acquired. Then, the acquired authentication data is compared with the authentication data associated with the print data ID stored in the registered authentication data storing area 77 to perform the user authentication. When the user authentication is successfully completed (i.e., when the input authentication data matches the authentication data stored in the registered authentication storing area 77), recording of the image represented by the print data indentified by the print data ID on the recording medium is started.

The above-described embodiment may be modified such that the user authentication is executed by a plurality of times. Specifically, for example, in a first user authentication, it is judged whether the authentication data that identifies the user (e.g., the authentication data stored in a ID card the user owns) matches the authentication data that is preliminarily stored in the recording system 1 (e.g., the printing device 60) to determine the user is the authorized user. After the first user authentication, a list of print data IDs associated with the user ID of the authorized user is displayed on the I/O unit 65 to have the user select one of the print data IDs. Then, for the selected print data (print data ID), the user is requested to input a password (i.e., authentication data). Then, it is judged whether the thus input authentication data (i.e., password) matches the authentication data preliminarily stored in association with the selected print data. Only when the both pieces of authentication data match, recording of the image represented by the selected print data on the recording medium is started. As above, with a plurality of times of user authentication, possibility of information leakage can be further lowered.

According to the above-described embodiment, the print data transmitted from the terminal device 20 to the host device 40 is application data. This configuration may be modified such that, the print data (application data) is converted to the PDL data in the terminal device 20, and the PDL data is transmitted from the terminal device 20 to the host device 40. In such a modification, a communication time period for transmitting the print data from the terminal device 20 to the host device 40 can be shortened.

In the above-described embodiment, the recording system 1 includes the terminal device 20, the host device 40 and the printing device 60. This configuration is an exemplary one and can be modified. For example, the recording system (1) may include the terminal device (20) and a printing device (60) that is communicably connected to the terminal device (20). In such a configuration, the terminal device (20) may function as the host device as well as the terminal device described above. In the description of modifications, the reference numbers are indicated in parentheses to show that the device (unit, system, etc.) correspond to those of the embodiment but may not be identical in terms of their functions.

Specifically, in such a modified configuration, the communication control unit (28) of the terminal device (20) transmits the print data stored in the image data storing unit (31) and the authentication data stored in the authentication storing unit (30) to the printing device (60) in response to the print information transmission input by the user. Further, if the communication control unit (28) receives, from the printing device (60), the print data request data requesting transmission of the print data regarding the print request, the communication control unit (28) transmits the print data identified by the print data request data and stored in the image data storing area (31) to the printing device (60). Then, when the print data request command is received from the recoding status judging unit (69), the communication control unit (73) of the printing device (60) transmits the print data request data (see FIG. 4F) containing the print data ID designated by the print data request command and the sending device identifying information of the printing device (60) (i.e., sending printing device ID) to the printing device (60).

With such a configuration, since the print data is stored in the print data storing unit (76) of the printing device (60), a time period from the user input of the authentication data at the printing device (60) to the start of printing an image represented by the print data on the recording medium can be made shorter in comparison with a conventional case where the print data is transmitted to the printing device (60) after the authentication is executed at the terminal device (20). In addition, since the print data is stored in the image data storing area (31) of the terminal device (20) and the print data storing area (76) of the printing device (60), if the remaining capacity of the print data storing area (76) becomes small, it is sufficient to delete the print data from the print data storing area (76), and it is unnecessary to execute a communication process to evacuate the print data by transmitting the same to the terminal device (20) or the like. Therefore, according to the modification, a communication process between the printing device (60) and the terminal device (20) can be simplified.

It should be noted that the above-described embodiment and its modifications are exemplary ones and can further be modified in various ways without departing from the scope of the invention. For example, in the above-described embodiment, the printing device 60 has the judging unit 71 which judges whether the print data stored in the print data storing area is to be deleted before the print request regarding the print data is issued. This configuration may be modified such that the judging unit (71) is provided to the host device (40) or the terminal device (20) instead of the printing device (60).

In the above-described embodiment, the image processing unit 67 converts the print data (PDL data) received from the host device 40 to the drive data for the printing device 60 before the user authentication. Such a configuration may be modified such that the conversion of the print data to the drive data is executed after the user authentication. Specifically, the print data (PDL data) received from the host device 40 may be stored in the print data storing area 76 of the storage 64 without converting to the drive data, and the image processing unit 67 may convert the drive data stored in the print data storing area 76 to the drive data.

According to the above-described embodiment, the control process of the terminal device 20 is stored in the ROM 22, the control process of the host device 40 is stored in the ROM 42 and the control process of the printing device 60 is stored in the ROM 62. In a modification, it is possible that all the processes (programs) are stored in the same ROM (e.g., the ROM 42 of the host device 40). In such an example, the host device 40 may remotely control the terminal device (20) and the host device (40) based on the control process (program) stored in the ROM 42.

What is claimed is:

1. A printing system, comprising:
a plurality of terminal devices configured to generate print data representing an image;
a printing device configured to print the image on a sheet, the printing device having a first storage;
a host device in communication with the plurality of terminal devices and the printing device, the host device having a second storage configured to store the print data;
a user authentication unit configured to acquire user input of authentication data, and execute user authentication based on the user-input authentication data in response to a print request, printing of the image being executed after the authentication is successfully completed;
a first judging unit configured to judge whether the print data stored in the first storage is to be deleted before the print request is received,
wherein each of the plurality of terminal devices comprises a terminal side transmission unit configured to transmit the print data to the host device,
wherein the host device comprises a host side communication unit which is configured to:
receive the print data from the plurality of terminal devices and store the received print data in the second storage;
transmit the received print data to the printing device before the user authentication is executed; and
if a request to transmit print data is received from the printing device, transmit the print data to the printing device,
wherein the printing device comprises:
a printing side receiving unit configured to receive the print data from the host device and store the received print data in the first storage;
a first deletion unit configured to delete the print data which is judged to be deleted by the first judging unit from the first storage; and
a second judging unit configured to judge, when the authentication data is acquired by the user authentication unit and the print request is made, whether the print data has been deleted,
wherein, the printing device is configured to print images on the sheet based on the print data stored in the first storage when the second judging unit judges that the print data has not been deleted and is stored in the first storage; and
wherein the printing device is configured to transmit the request to transmit print data to the host device and is configured to obtain the print data, and is configured to print images on the sheet based on the obtained print data when second judging unit judges that the print data has been deleted and is not stored in the first storage.

2. The printing system according to claim 1, wherein the first judging unit is configured to judge that the print data is to be deleted if the print request is not made within a predetermined time period since the print data was stored in the first storage.

3. The printing system according to claim 1, wherein the first judging unit is configured to judge that at least one of a plurality of pieces of print data stored in the first storage is to be deleted if a remaining capacity of the first storage is less than a predetermined amount.

4. The printing system according to claim 1,
wherein the print data stored in the second storage is PDL data, and
wherein the print data stored in the first storage is drive data which is generated by processing the PDL data.

5. The printing system according to claim 1,
wherein the host device further comprises a second deletion unit configured to delete the print data stored in the second storage, and
wherein, when the image represented by the print data is printed on the sheet by the printing device, the first deletion unit and the second deletion unit is configured to delete the print data from the first storage and the second storage.

6. The printing system according to claim 1, wherein the host side communication unit is configured to transmit, based on instructions from the plurality of terminal devices or the printing device, the print data stored in the second storage to the printing device, the print data transmitted to the printing device being stored in the first storage.

7. The printing system according to claim 1,
wherein the user authentication is executed by comparing user-input authentication data with the authentication data preliminarily stored in the printing system or the printing device.

8. The printing system according to claim 1, further comprising a plurality of printing devices connected to the host device, wherein the host side communication unit is configured to transmit the print data to at least two printing devices, and wherein, if one of the at least two printing devices prints out the print data received from the host side communication unit, the first deletion unit of each of the at least two printing devices is configured to delete the print data from the first storage.

9. The printing system according to claim 1,
wherein, when the print data in the printing device is deleted, a deletion notification is transmitted from the printing device to the host device,
wherein the host device is configured to transmit the received deletion notification to the terminal device, and
wherein the terminal device is configured to display the received deletion notification.

10. The printing system according to claim 1, wherein when the terminal device sends a re-transmission request to the host device corresponding to the deletion notification, the host device is configured to transmit print data corresponding to the re-transmission request to the printer.

11. The printing system according to claim 1,
wherein the printing device is configured to store the print data and identification information corresponding to the print data,
wherein, before printing, the image data stored in the printing device can be deleted but the identification information is not deleted, and
wherein after printing, both the print data and the identification data are deleted.

12. The printing system according to claim 11, wherein when the printing device transmits a re-transmission request which includes the identification information to the host device, the host device is configured to transmit the print data corresponding to the identification information to the printer.

13. The printing system according to claim 11,
wherein, authentication data corresponding to the print data is stored in the printing device,
wherein, before printing, the print data and the corresponding authentication data can be deleted, but the identification information is not deleted, and
wherein, after printing, all the print data, authentication data and the identification information are deleted.

14. A host device employed in a printing system which is provided with a plurality of terminal devices configured to generate print data representing an image to be printed on a sheet, a printing device configured to print the image on the printing sheet, the printing device having a first storage, the host device in communication with the plurality of terminal devices and the printing device having a second storage configured to store the print data, a judging unit configured to judge whether the print data stored in the first storage is to be deleted before the print request is received, and a first deletion unit configured to delete the print data which is judged to be deleted by the judging unit from the first storage, wherein the printing device is configured to acquire user input of authentication data, and execute user authentication based on the user-input authentication data in response to a print request, printing of the image being executed after the authentication is successfully completed, the host device comprising:
a host side communication unit configured to receive the print data from the plurality of terminal devices and store the received print data in the second storage and transmit the received print data to the printing device before the user authentication is executed,
wherein, when the authentication data is acquired and the print request is made, the host device is configured to receive the request to print data transmitted by the print device, if the print data has been deleted by the first deletion unit and is not stored in the first storage, and
wherein, if the request to print data is received, the host side communication unit is configured to transmit the print data stored in the second storage to the printing device.

15. A printing device employed in a printing system which is provided with a plurality of terminal devices configured to generate print data representing an image, the printing device configured to print the image on a sheet, the printing device having a first storage, a host device in communication with the plurality of terminal devices and the printing device and having a second storage configured to store the print data, a judging unit configured to judge whether the print data stored in the first storage is to be deleted before the print request is received, and a first deletion unit configured to delete the print data which is judged to be deleted by the judging unit from the first storage, wherein the printing device is configured to acquire user input of authentication data, and execute user authentication based on the user-input authentication data in response to a print request, printing of the image being executed after the authentication is successfully completed,
wherein the printing device comprises:
a printing side receiving unit configured to receive the print data from the host device and store the received print data in the first storage;
a first deletion unit configured to delete the print data which is judged to be deleted by the judging unit from the first storage; and
a second judging unit configured to judge, when the authentication data is acquired by the user authentication unit and the print request is made, whether the print data received from the host device and stored in the first storage has been deleted,
wherein, the printing device is configured to print images on the printing sheet based on the print data stored in the first storage when the second judging unit judges that the print data has not been deleted and is stored in the first storage, and
wherein the printing device is configured to transmit the request to transmit print data to the host device and is configured to obtain the print data, and is configured to print images on the sheet based on the obtained print data when the second judging unit judges that the print data has been deleted and is not stored in the first storage.

16. A computer accessible storage device storing control programs for a printing system which is provided with a plurality of terminal devices configured to generate print data representing an image to be printed on a sheet, a printing device configured to print an image on the sheet, the printing device having a first storage, a host device in communication with the plurality of terminal devices and the printing device and having a second storage configured to store the print data, and a user authentication unit configured to acquire user input of authentication data, and execute user authentication based on the user-input authentication data in response to a print request, printing of the image being executed after the authentication is successfully completed,
wherein the programs, when executed, cause:
one of the plurality of terminal devices, the printing device and the host device to judge in a first judging process whether the print data stored in the first storage is to be deleted before the print request is received;
each of the plurality of terminal devices to execute a terminal side transmission process to transmit the print data to the host device;
the host device to execute a host side communication process which is configured to:

receive the print data from the plurality of terminal devices and store the received print data in the second storage;

transmit the received print data to the printing device before the user authentication is executed; and if a request to transmit print data is received from the printing device, transmit the print data to the printing device, the printing device to execute:

a printing side receiving process to receive the print data from the host device and store the received print data in the first storage;

a first deletion process to delete the print data which is judged to be deleted by the judging unit from the first storage; and a second judging process to judge, when the authentication data is acquired by the user authentication unit and the print request is made, whether the print data has been deleted from the first storage, a printing process which is configured such that, the printing device is configured to print images on the sheet based on the print data stored in the first storage when the second judging process judges that the print data has not been deleted and is stored in the first storage, and wherein the printing device is configured to transmit the request to transmit print data to the host device and is configured to obtain the print data, and is configured to print images on the printing-sheet based on the obtained print data when the second judging process judges that print data has been deleted and is not stored in the first storage.

17. A computer accessible storage device storing control programs for a host device employed in a printing system which is provided with a plurality of terminal devices configured to generate print data representing an image to be printed on a sheet, a printing device configured to print the image on the sheet, the printing device having a first storage, the host device in communication with the plurality of terminal devices and the printing device and having a second storage configured to store the print data, a judging unit configured to judge whether the print data stored in the first storage is to be deleted before the print request is received, and a first deletion unit configured to delete the print data which is judged to be deleted by the judging unit from the first storage, wherein the printing device is configured to acquire user input of authentication data, and execute user authentication based on the user-input authentication data in response to a print request, printing of the image being executed after the authentication is successfully completed, programs, when executed, cause the computer to execute:

a host side communication process to receive the print data from the plurality of terminal devices and store the received print data in the second storage and transmit the received print data to the printing device before the user authentication is executed, and a requested print data transmission process to transmit the print data which is transmitted from the printing device and received by the host device, when the authentication data is acquired and the print request is made, and if the print data has been deleted by the first deletion unit and is not stored in the first storage.

18. A computer accessible storage device storing control programs for a printing device employed in a printing system which is provided with a plurality of terminal devices configured to generate print data representing an image, the printing device configured to print the image on a sheet, the printing device having a first storage, a host device in communication with the plurality of terminal devices and the printing device and having a second storage configured to store the print data, a judging unit configured to judge in a first judging process whether the print data stored in the first storage is to be deleted before the print request is received, and a first deletion unit configured to delete the print data which is judged to be deleted by the judging unit from the first storage, wherein the printing device is configured to acquire user input of authentication data, and execute user authentication based on the user-input authentication data in response to a print request, printing of the image being executed after the authentication is successfully completed, wherein the programs cause, when executed, the printing device to execute:

a printing device side receiving process to receive the print data from the host device and store the received print data in the first storage;

a first deletion process to delete the print data which is judged to be deleted by the judging unit from the first storage; and a second judging process configured to judge, when the authentication data is configured by the user authentication unit and the print request is made, whether the print data received from the host device and stored in the first storage has been deleted, a printing process, wherein, the printing device is configured to print images on the printing-sheet based on the print data stored in the first storage when the second judging process judges that the print data has not been deleted and is stored in the first storage, and wherein the printing device is configured to transmit the request to transmit print data to the host device and is configured to obtain the print data, and is configured to print images on the sheet based on the obtained print data when the second judging process judges that the print data has been deleted and is not stored in the first storage.

19. A printing system, comprising:

a plurality of terminal devices configured to generate print data representing an image;

a printing device in communication with the terminal devices and configured to print the image on a sheet, the printing device having a first storage capable of storing the print data, wherein, the printing device acquires user input of authentication data, a user authentication being executed based on the user-input authentication data in response to a print request, printing of the image being executed after the authentication is successfully completed; and a judging unit configured to judge whether the print data stored in the first storage is to be deleted before the print request, wherein each of the plurality of terminal devices comprises:

a terminal side transmission unit configured to transmit the print data to a host device, wherein the host device comprises a host side communication unit which is configured to:

receive the print data from the plurality of terminal devices and store the received print data in the second storage;

transmit the received print data to the printing device before the user authentication is executed; and if a request to transmit print data is received from the printing device, transmit the print data to the printing device, wherein the printing device comprises:
- a printing device side receiving unit configured to receive the print data from the host device and store the received print data in the first storage;
- a first deletion unit configured to delete the print data which is judged to be deleted by the judging unit from the first storage and
- a second judging unit configured to judge, when the authentication data is acquired by the user authentication unit and the print request is made, whether the print data has been deleted from the first storage, wherein, the printing device is configured to print images on the sheet based on the print data stored in the first storage when the second judging unit judges that the print data has been deleted and is stored in the first storage, and wherein the printing device is configured to transmit the request to transmit print data to the host device and is configured to obtain the print data, and is configured to print images on the sheet based on the obtained print data when the second judging unit judges that print data has been deleted and is not stored in the first storage.

* * * * *